United States Patent
Kim et al.

(10) Patent No.: US 11,552,730 B2
(45) Date of Patent: Jan. 10, 2023

(54) TRANSMITTER TRANSMITTING SIGNALS TO CHANNELS, RECEIVER RECEIVING SIGNALS FROM CHANNELS, AND SEMICONDUCTOR SYSTEM INCLUDING THE TRANSMITTER AND THE RECEIVER

(71) Applicant: Samsung Electronics Co., Ltd., Suwon-si (KR)

(72) Inventors: Kyongho Kim, Hwaseong-si (KR); Changsik Yoo, Seoul (KR); Kyungmin Kim, Seoul (KR)

(73) Assignees: SAMSUNG ELECTRONICS CO., LTD., Gyeonggi-Do (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 17/144,425

(22) Filed: Jan. 8, 2021

(65) Prior Publication Data
US 2021/0328713 A1    Oct. 21, 2021

(30) Foreign Application Priority Data

Apr. 21, 2020 (KR) .................. 10-2020-0048118

(51) Int. Cl.
*H04L 1/00* (2006.01)
(52) U.S. Cl.
CPC .......... *H04L 1/0042* (2013.01); *H04L 1/0048* (2013.01); *H04L 1/0061* (2013.01)

(58) Field of Classification Search
CPC ... H04L 1/0042; H04L 1/0048; H04L 1/0041; H04L 1/0045; H04B 3/32; H04B 3/02; H04B 7/14; H04B 7/005
See application file for complete search history.

(56) References Cited

U.S. PATENT DOCUMENTS

| | | | |
|---|---|---|---|
| 4,486,739 A | 12/1984 | Franaszek et al. | |
| 6,393,082 B1 * | 5/2002 | Nakamura | H03M 9/00 370/514 |
| 6,700,510 B1 | 3/2004 | Kryzak et al. | |

(Continued)

FOREIGN PATENT DOCUMENTS

| KR | 19990045080 A | 6/1999 |
|---|---|---|
| KR | 100799683 B1 | 2/2008 |

OTHER PUBLICATIONS

S. Sudhakaran et al. "8B9B Encoding for Crosstalk Reduction in a High-Speed Parallel Bus" NVIDIA Corporation, copy right 2016, IEEE, downloaded on Sep. 21, 2020. pp. 29-32.

*Primary Examiner* — Jamal Javaid
(74) *Attorney, Agent, or Firm* — Harness, Dickey & Pierce, P.L.C.

(57) ABSTRACT

Disclosed is a transmitter which includes an encoder and a transmission interface circuit. The encoder receives data bits and generates conversion bits, a number of is the conversion bits being more than a number of the data bits, based on the number of the data bits. The encoder detects a risk pattern of the conversion bits to generate detection data and converts the risk pattern into a replacement pattern based on the detection data to generate code bits, a number of is the code bits being equal to the number of the conversion bits.

14 Claims, 19 Drawing Sheets

(56) References Cited

U.S. PATENT DOCUMENTS

| | | | |
|---|---|---|---|
| 6,732,322 B1 * | 5/2004 | Miyauchi | G06F 11/1072 714/763 |
| 6,812,870 B1 | 11/2004 | Kryzak et al. | |
| 6,977,599 B2 | 12/2005 | Widmer | |
| 7,061,407 B1 | 6/2006 | Lee | |
| 7,403,149 B2 | 7/2008 | Kim | |
| 8,552,891 B2 | 10/2013 | Bae et al. | |

* cited by examiner

FIG. 3

| Transition | Delay | | Xtalk |
|---|---|---|---|
| | Inductive | Capacitive | |
| — ↑ — | 1 | 1 | X |
| ↓ ↑ — | 1−Δ | 1+Δ | O |
| — ↑ ↓ | 1−Δ | 1+Δ | O |
| ↑ ↑ — | 1+Δ | 1+Δ | O |
| — ↑ ↑ | 1+Δ | 1+Δ | O |
| ↑ ↑ ↑ | 1+2Δ | 1+2Δ | OO |
| ↓ ↑ ↓ | 1−2Δ | 1+2Δ | OO |
| ↓ ↑ ↑ | 1 | 1 | Δ |
| ↑ ↑ ↓ | 1 | 1 | Δ |

| D[7:4] | | | | S[9:5] | | | | | D[3:0] | | | | S[4:0] | | | | |
|---|---|---|---|---|---|---|---|---|---|---|---|---|---|---|---|---|---|
| 7 | 6 | 5 | 4 | 9 | 8 | 7 | 6 | 5 | 3 | 2 | 1 | 0 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 1 | 0 | 0 | 0 | 1 | 0 | 0 | 0 | 1 | 0 |
| 0 | 0 | 1 | 0 | 0 | 0 | 0 | 1 | 0 | 0 | 0 | 1 | 0 | 0 | 0 | 1 | 0 | 0 |
| 0 | 0 | 1 | 1 | 0 | 0 | 0 | 1 | 1 | 0 | 0 | 1 | 1 | 0 | 0 | 1 | 1 | 0 |
| 0 | 1 | 0 | 0 | 0 | 0 | 1 | 0 | 0 | 0 | 1 | 0 | 0 | 0 | 1 | 0 | 0 | 0 |
| 0 | 1 | 0 | 1 | 0 | 0 | 1 | 0 | 1 | 0 | 1 | 0 | 1 | 0 | 1 | 0 | 1 | 0 |
| 0 | 1 | 1 | 0 | 0 | 0 | 1 | 1 | 0 | 0 | 1 | 1 | 0 | 0 | 1 | 1 | 0 | 0 |
| 0 | 1 | 1 | 1 | 1 | 1 | 0 | 0 | 0 | 0 | 1 | 1 | 1 | 1 | 0 | 0 | 0 | 1 |
| 1 | 0 | 0 | 0 | 0 | 1 | 0 | 0 | 0 | 1 | 0 | 0 | 0 | 1 | 0 | 0 | 0 | 0 |
| 1 | 0 | 0 | 1 | 0 | 1 | 0 | 0 | 1 | 1 | 0 | 0 | 1 | 1 | 0 | 0 | 1 | 0 |
| 1 | 0 | 1 | 0 | 0 | 1 | 0 | 1 | 0 | 1 | 0 | 1 | 0 | 1 | 0 | 1 | 0 | 0 |
| 1 | 0 | 1 | 1 | 1 | 0 | 1 | 0 | 0 | 1 | 0 | 1 | 1 | 0 | 1 | 0 | 0 | 1 |
| 1 | 1 | 0 | 0 | 0 | 1 | 1 | 0 | 0 | 1 | 1 | 0 | 0 | 1 | 1 | 0 | 0 | 0 |
| 1 | 1 | 0 | 1 | 1 | 0 | 0 | 1 | 0 | 1 | 1 | 0 | 1 | 0 | 0 | 1 | 0 | 1 |
| 1 | 1 | 1 | 0 | 1 | 0 | 0 | 0 | 1 | 1 | 1 | 1 | 0 | 0 | 0 | 0 | 1 | 1 |
| 1 | 1 | 1 | 1 | 1 | 0 | 0 | 0 | 0 | 1 | 1 | 1 | 1 | 0 | 0 | 0 | 0 | 1 |

Added bit

Added bit

TRANSMITTER TRANSMITTING SIGNALS TO CHANNELS, RECEIVER RECEIVING SIGNALS FROM CHANNELS, AND SEMICONDUCTOR SYSTEM INCLUDING THE TRANSMITTER AND THE RECEIVER

CROSS-REFERENCE TO RELATED APPLICATIONS

This application claims priority under 35 U.S.C. § 119 to Korean Patent Application No. 10-2020-0048118 filed on Apr. 21, 2020, in the Korean Intellectual Property Office, the disclosures of which are incorporated by reference herein in their entireties.

BACKGROUND

Example embodiments of the inventive concepts described herein relate to transceivers, and more particularly, relate to transmitters to transmit signals to channels, receivers to receive signals from the channels, and/or semiconductor systems including the transmitter and the receiver.

In a high-speed parallel data interface, data bits may be transmitted in parallel through a channel. When signals are transmitted through a channel such as a coaxial cable or a printed circuit board (PCB) trace, data may transition. This transition affects an adjacent channel, a crosstalk phenomenon by which the data transmission of the adjacent channel is hindered occurs.

In particular, as a semiconductor device and a system are highly integrated, a distance between channels may decrease, and the crosstalk influence may increase. Accordingly, there is a demand on decreasing the crosstalk influence between channels.

SUMMARY

Example embodiments of the inventive concepts provide a transmitter to transmit signals to channels, a receiver to receive signals from the channels, and/or a semiconductor system including the transmitter and the receiver, thus reducing a crosstalk between channels.

According to some example embodiments, a transmitter which outputs transmission signals in parallel to channels includes an encoder and a transmission interface circuit. The encoder receives data bits having a target logical value, generates conversion bits based on a number of the data bits, a number of the conversion bits being more than the number of the data bits, detects a risk pattern of the conversion bits to generate detection data, and converts the risk pattern into a replacement pattern based on the detection data to generate code bits, a number of the code bits being equal to the number of the conversion bits. The transmission interface circuit converts the code bits into the transmission signals.

According to some example embodiments, a receiver which receives reception signals in parallel from channels includes a reception interface circuit and a decoder. The reception interface circuit converts the reception signals into code bits. The decoder generates detection data based on a pattern of the code bits, converts at least a part of the code bits into a risk pattern based on the detection data to generate conversion bits, and converts the conversion bits into data bits, a number of the data bits being less than a number of the conversion bits. The conversion bits, respectively corresponding to 4 channels sequentially arranged, have 3 or more conversion bits having a target logical value in the risk pattern.

According to some example embodiments, a semiconductor system includes a transmitter, a channel unit, and a receiver. The transmitter generates conversion bits, a number of the conversion bits being more than a number of data bits, based on a number of the data bits each having a target logical value from among the data bits, and converts a risk pattern into a replacement pattern to generate code bits when the conversion bits have a risk pattern. The channel unit includes channels, a number of is the channels being equal to a number of the code bits, and configured to receive signals generated based on the code bits. The receiver receives the signals through the channel unit, converts the signals into the code bits, and converts the code bits into the data bits.

BRIEF DESCRIPTION OF THE FIGURES

The above and other objects and features of the inventive concepts will become apparent by describing in detail example embodiments thereof with reference to the accompanying drawings.

FIG. 3 is a diagram for describing a transition and a crosstalk described in FIGS. 1 and 2.

DETAILED DESCRIPTION

Below, example embodiments of the inventive concepts will be described clearly and in detail with reference to accompanying drawings to such an extent that an ordinary one in the art implements example embodiments of the inventive concepts.

Figure 1:
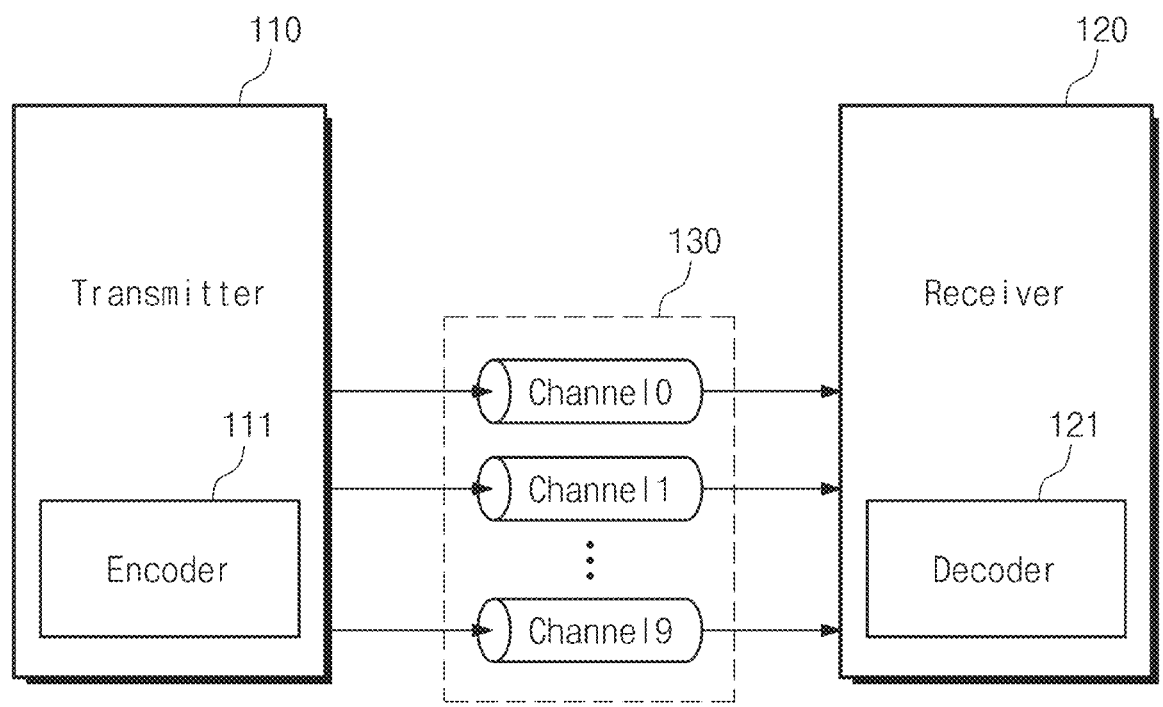
FIG. 1 is a block diagram of a semiconductor system according to some example embodiments of the inventive concepts.

FIG. 1 is a block diagram of a semiconductor system according to some example embodiments of the inventive concepts. Referring to FIG. 1, a semiconductor system 100 includes a transmitter 110, a receiver 120, and/or channels 130. The semiconductor system 100 may transfer data or signals in parallel through the channels 130.

The transmitter 110, receiver 120, or other components and sub-components (e.g., encoder 111, decoder 121, etc.) may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The transmitter 110 may transmit signals in parallel to the channels 130. The transmitter 110 may generate signals to be transmitted, based on data bits. When the signals are output to the channels 130 in parallel, a transition may occur at the channels 130 due to the signals. For example, in the case where a transition occurs at a channel adjacent to a target channel, the signal transmission of the target channel may be hindered. This phenomenon may be called a "crosstalk". To reduce the occurrence of the crosstalk, the transmitter 110 may include an encoder 111.

The encoder 111 may receive data bits and may encode the data bits to code bits. When a logical value of a transmission bit is "1", a transition of the transmission bit may occur, thereby affecting an adjacent channel. Accordingly, the encoder 111 may generate code bits based on the number of bits each having a logical value of "1" from among data bits and a pattern of the logical value of "1" at the data bits. The number of code bits may be more than the number of data bits. However, a pattern causing a crosstalk may not be found at the code bits. The transmitter 110 may convert code bits into transmission signals and may output transmission signals to the channels 130. The encoder 111 will be more fully described later.

The receiver 120 may receive signals in parallel from the channels 130. The receiver 120 may convert the received signals into code bits. The receiver 120 may recover the code bits to data bits. To this end, the receiver 120 may include a decoder 121. The decoder 121 may receive code bits and may decode the code bits to data bits. The decoder 121 will be more fully described later.

The channels 130 may be a path that physically or electrically connects the transmitter 110 and the receiver 120. For example, the channels 130 may be implemented by using a trace of a printed circuit board (PCB) or a coaxial cable. When signals are transferred through the channels 130, a transition may be caused by the signals. For example, when a signal corresponding to a logical value of "1" is transferred through the channels 130, a rising edge or a falling edge may be caused. In some example embodiments, a crosstalk may occur at channels adjacent to a channel where the transition occurs. According to the inventive concept, signals that the channels 130 receive may be generated based on code bits for reducing a crosstalk. Encoding/decoding for reducing a crosstalk will be described below.

Figure 2:
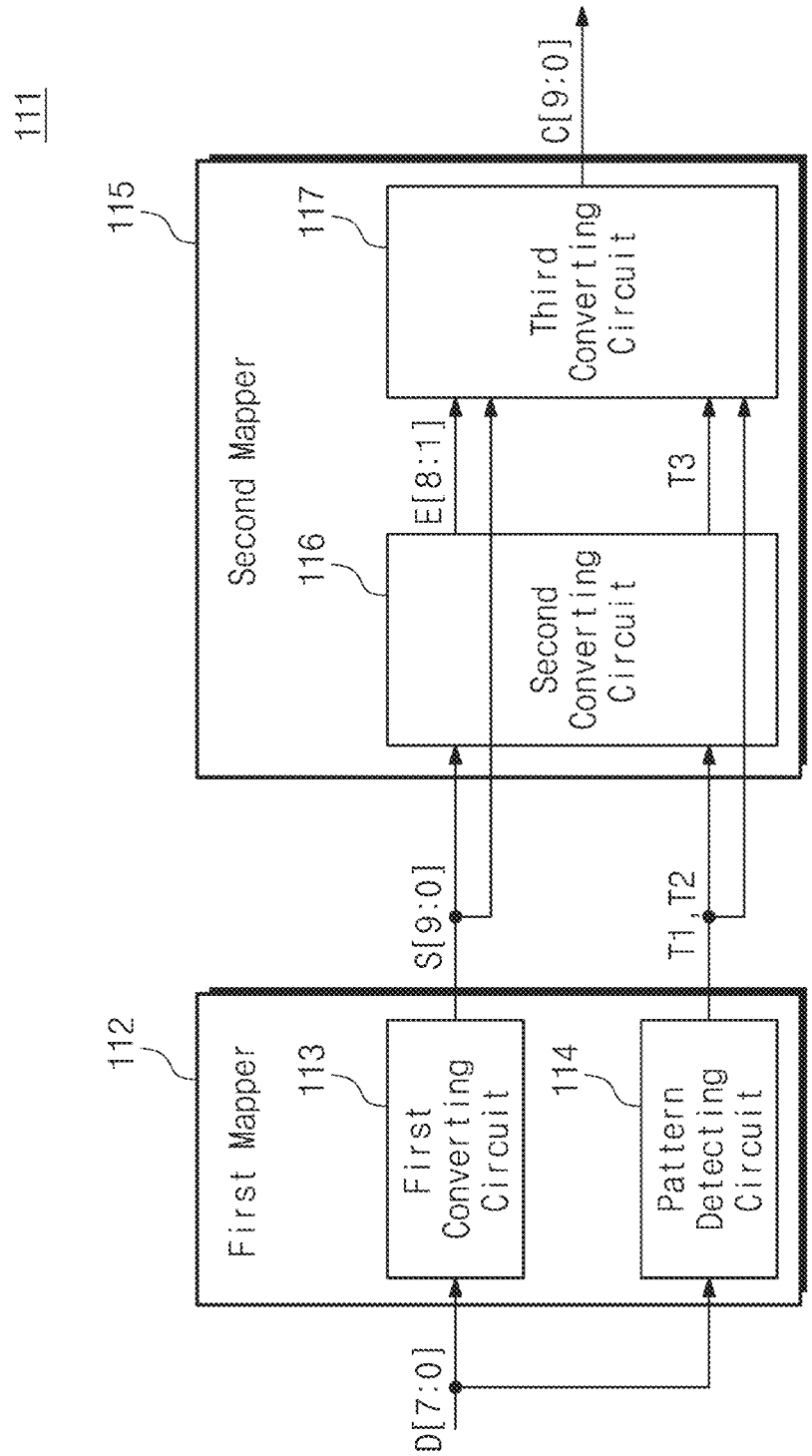
FIG. 2 is an exemplary block diagram of an encoder of FIG. 1.

FIG. 2 is an exemplary block diagram of an encoder of FIG. 1. The encoder 111 of FIG. 2 may encode 8 data bits D[7:0] to 10 code bits C[9:0]. In some example embodiments, the number of channels 130 of FIG. 1 may be "10". Referring to FIG. 2, the encoder 111 may include a first mapper 112 and a second mapper 115.

The first mapper 112 may generate conversion bits S[9:0] and detection bits T1 and T2, based on the data bits D[7:0].

The first mapper 112 may include a first converting circuit 113 for generating the conversion bits S[9:0] and a pattern detecting circuit 114 for generating the detection bits T1 and T2.

The first converting circuit 113 may generate the conversion bits S[9:0] based on the number of bits each having a target logical value (e.g., a logical value of "1") causing a transition from among the data bits D[7:0]. The first converting circuit 113 may generate first partial conversion bits S[9:5] based on the number of target logical values included in first partial data bits D[7:4] of the data bits D[7:0]. The first converting circuit 113 may generate second partial conversion bits S[4:0] based on the number of target logical values included in second partial data bits D[3:0] of the data bits D[7:0].

When the number of 1s included in the first partial data bits D[7:4] is more than half the total number of first partial data bits D[7:4], that is, is "3" or more, the first converting circuit 113 may invert logical values of the first partial data bits D[7:4]. As such, the number of is may decrease. S[8:5] of the first partial conversion bits S[9:5] may be equal to D[7:4] or an inverted version of D[7:4]. S[9] of the first partial conversion bits S[9:5] may be an added bit indicating whether D[7:4] is inverted.

When the number of is included in the second partial data bits D[3:0] is more than half the total number of second partial data bits D[3:0], that is, is "3" or more, the first converting circuit 113 may invert logical values of the second partial data bits D[3:0]. As such, the number of 1s may decrease. S[4:1] of the second partial conversion bits S[4:0] may be equal to D[3:0] or an inverted version of D[3:0]. S[0] of the second partial conversion bits S[4:0] may be an additional bit indicating whether D[3:0] is inverted.

The pattern detecting circuit 114 may detect a risk pattern included in the conversion bits S[9:0] to generate the first detection bit T1 and the second detection bit T2. Here, the risk pattern may be defined by a pattern including three or more 1s when extracting 4 bits sequentially arranged from the conversion bits S[9:0]. For example, "1101", "1011", "1110", "0111", etc. may be defined as a risk pattern. In other words, the three or more is do not need to be sequential, only that there are three or more 1s of 4 sequentially arranged conversion bits S[9:0].

The pattern detecting circuit 114 may generate the first detection bit T1 as a result of detecting whether the number of 1s includes in the first partial data bits D[7:4] is "2" and a risk pattern is present in the conversion bits S[9:0]. When the number of is included in the first partial data bits D[7:4] is "2", a logical value of "1" is not inverted in a data converting operation of the first converting circuit 113. However, a risk pattern may be found when the first partial data bits D[7:4] and the second partial data bits D[3:0] are arranged. For example, when D[7:0]="00101100", the first detection bit T1 may indicate whether a risk pattern is not found at the first partial data bits D[7:4] but a risk pattern is found at the conversion bits S[9:0].

Likewise, the pattern detecting circuit 114 may generate the second detection bit T2 as a result of detecting whether the number of 1s included in the second partial data bits D[3:0] is "2" and a risk pattern is present in the conversion bits S[9:0]. A risk pattern may be absent from the second partial data bits D[3:0], but a risk pattern may be found when the first partial data bits D[7:4] and the second partial data bits D[3:0] are arranged. For example, when D[7:0]="00110100", the second detection bit T2 may indicate whether a risk pattern is not found at the second partial data bits D[3:0] but a risk pattern is found at the conversion bits S[9:0].

The second mapper 115 may generate code bits C[9:0] by removing a risk pattern present in the conversion bits S[9:0] based on the first and second detection bits T1 and T2. The second mapper 115 may include a second converting circuit 116 for generating a replacement pattern for replacing a risk pattern and a third converting circuit 117 for generating the code bits C[9:0].

The second converting circuit 116 may generate replacement bits E[8:1] based on the conversion bits S[9:0]. The second converting circuit 116 may generate the replacement bits E[8:1] by using S[8:1] of the conversion bits S[9:0]. When a risk pattern is present in the conversion bits S[9:0], the replacement bits E[8:1] converted by the second converting circuit 116 may not have a risk pattern. As such, the number of bits each having a logical value of "1" from among 4 bits sequentially arranged in the replacement bits E[8:1] is less than "3". This pattern is defined as a replacement pattern.

The second converting circuit 116 may generate a third detection bit T3 based on the first and second detection bits T1 and T2. The third detection bit T3 may indicate whether a risk pattern is found at the conversion bits S[9:0]. For example, the third detection bit T3 may be generated based on a NOR operation of the first and second detection bits T1 and T2.

The third converting circuit 117 may generate the code bits C[9:0] based on the third detection bit T3, the conversion bits S[9:0], and the replacement bits E[8:1]. When the third detection bit T3 indicates that a risk pattern is present in the conversion bits S[9:0], S[8:1] of the conversion bits S[9:0] may be replaced with the replacement bits E[8:1]. The code bits C[9:0] may include the replacement bits E[8:1]. Alternatively, when the third detection bit T3 indicates that a risk pattern is absent from the conversion bits S[9:0], the code bits C[9:0] may be identical to the conversion bits S[9:0]. As such, the code bits C[9:0] may not include a risk pattern causing a transition.

FIG. 3 is a diagram for describing a transition and a crosstalk described in FIGS. 1 and 2. Referring to FIG. 3, in a transition item, a rising arrow indicates a rising edge, and a falling arrow indicates a falling edge.

The transition item indicates a state of three channels adjacent to each other. When a logical value of a bit is "0", a transition may not occur at a signal to be transmitted to the channels 130 of FIG. 1. When a logical value of a bit is "1", a transition such as a rising edge or a falling edge may occur at a signal to be transmitted to the channels 130 of FIG. 1.

A crosstalk due to a transition occurring at channels (hereinafter referred to as a "first channel" and a "second channel") placed at opposite sides of a center channel (hereinafter referred to as a "reference channel") will be described. When a transition does not occur at the first and second channels, a crosstalk does not occur. When a transition occurs at one of the first and second channels, a crosstalk occurs. When transitions of the same type occur at the first and second channels, a crosstalk strongly occurs. When transitions of different types occur at the first and second channels, a crosstalk is canceled out.

The encoder 111 according to some example embodiments may make three adjacent bits not have a logical value of "1", thus reducing a crosstalk according to parallel data transmission. In addition, the encoder 111 according to some example embodiments may remove a risk pattern in which three or more of four adjacent bits have a logical value of "1", thus reducing a crosstalk according to parallel data transmission.

Figure 4:
FIG. 4 is a diagram for describing how data bits are converted into conversion bits by an encoder of FIG. 2.
Figure 4:

FIG. 4 is a diagram for describing how data bits are converted into conversion bits by an encoder of FIG. 2. Referring to FIG. 4, the 8 data bits D[7:0] may be converted into the 10 conversion bits S[9:0]. The data bits D[7:0] may be divided into the first partial data bits D[7:4] and the second partial data bits D[3:0]. The first partial data bits D[7:4] may be converted into the first partial conversion bits S[9:5], and the second partial data bits D[3:0] may be converted into the second partial conversion bits S[4:0].

When the number of 1s included in the first partial data bits D[7:4] is "3" or more, logical values of the first partial data bits D[7:4] may be inverted by the first converting circuit 113. This inversion may appear at S[8:5], and whether the inversion is made may be marked by an added bit such as S[9] Likewise, when the number of 1s included in the second partial data bits D[3:0] is "3" or more, logical values of the second partial data bits D[3:0] may be inverted. This inversion may appear at S[4:1], and whether the inversion is made may be marked by an added bit such as S[0].

According to the conversion scheme illustrated in FIG. 4, the number of 1s included in the first partial conversion bits S[9:5] may be less than "3", and the number of is included in the second partial conversion bits S[4:0] may be less than "3". However, a risk pattern may be generated when the first partial conversion bits S [9:5] and the second partial conversion bits S[4:0] are linked. This risk pattern may be removed by the second mapper 115 as described above.

Figure 5:
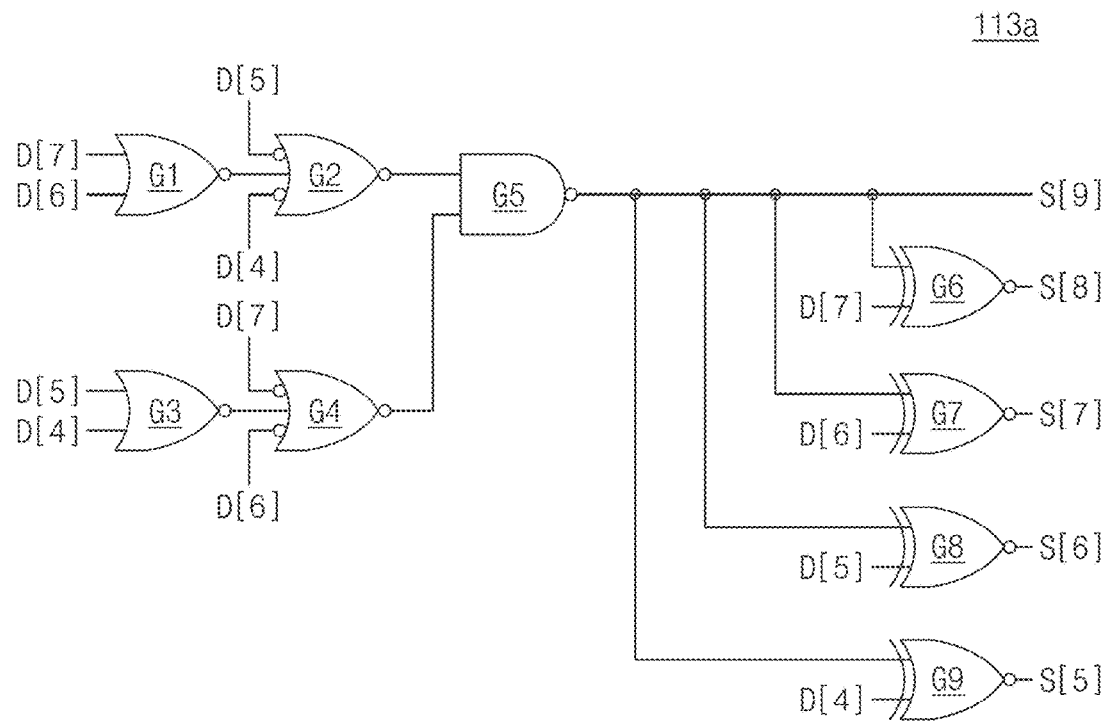
FIGS. 5 and 6 are exemplary logic circuit diagrams of a portion of a first converting circuit of FIG. 2.

FIG. 5 is an exemplary logic circuit diagram of a portion of a first converting circuit of FIG. 2. A first converting circuit 113a illustrated in FIG. 5 may be understood as a logic circuit that converts the first partial data bits D[7:4] into the first partial conversion bits S[9:5], which is described with reference to FIG. 4. Referring to FIG. 5, the first converting circuit 113a may include first to ninth gates G1 to G9.

The first gate G1 performs a NOR operation on D[6] and D[7]. The second gate G2 performs a NOR operation on an output of the first gate G1, an inverted version of D[4], and an inverted version of D[5]. The third gate G3 performs a NOR operation on D[4] and D[5]. The fourth gate G4 performs a NOR operation on an output of the third gate G3, an inverted version of D[6], and an inverted version of D[7]. The fifth gate G5 performs a NAND operation on an output of the second gate G2 and an output of the fourth gate G4.

The sixth gate G6 performs an XNOR operation on S[9] and D[7] to output S[8]. The seventh gate G7 performs an XNOR operation on S[9] and D[6] to output S[7]. The eighth gate G8 performs an XNOR operation on S[9] and D[5] to output S[6]. The ninth gate G9 performs an XNOR operation on S[9] and D[4] to output S[5]. As a result, the first partial conversion bits S[9:5] are output.

Figure 6:
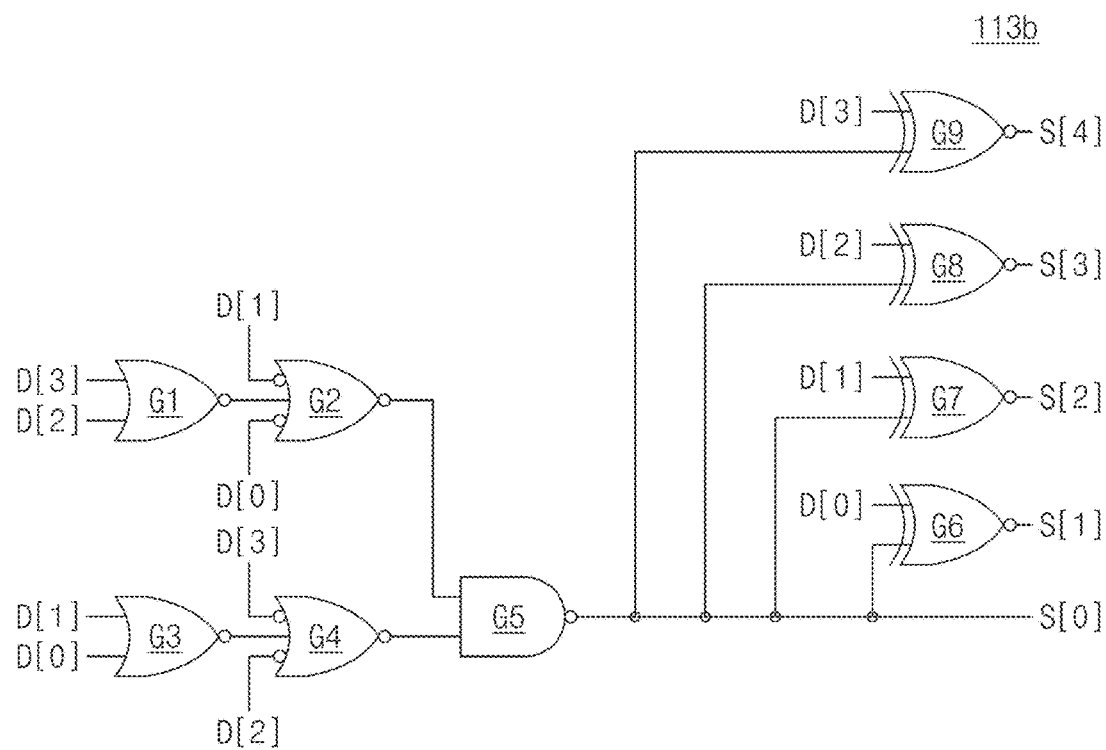

FIG. 6 is an exemplary logic circuit diagram of a portion of a first converting circuit of FIG. 2. A first converting circuit 113b illustrated in FIG. 6 may be understood as a logic circuit that converts the second partial data bits D[0:3] into the second partial conversion bits S[4:0], which is described with reference to FIG. 4. Referring to FIG. 6, the first converting circuit 113b may include first to ninth gates G1 to G9.

The first to ninth gates G1 to G9 of FIG. 6 correspond to the first to ninth gates G1 to G9 of FIG. 5, respectively, and a connection structure of FIG. 6 is substantially identical to that of FIG. 5. D[4:7] of FIG. 5 is replaced with D[0:3], and thus, the second partial conversion bits S[4:0] are output.

Figure 7:
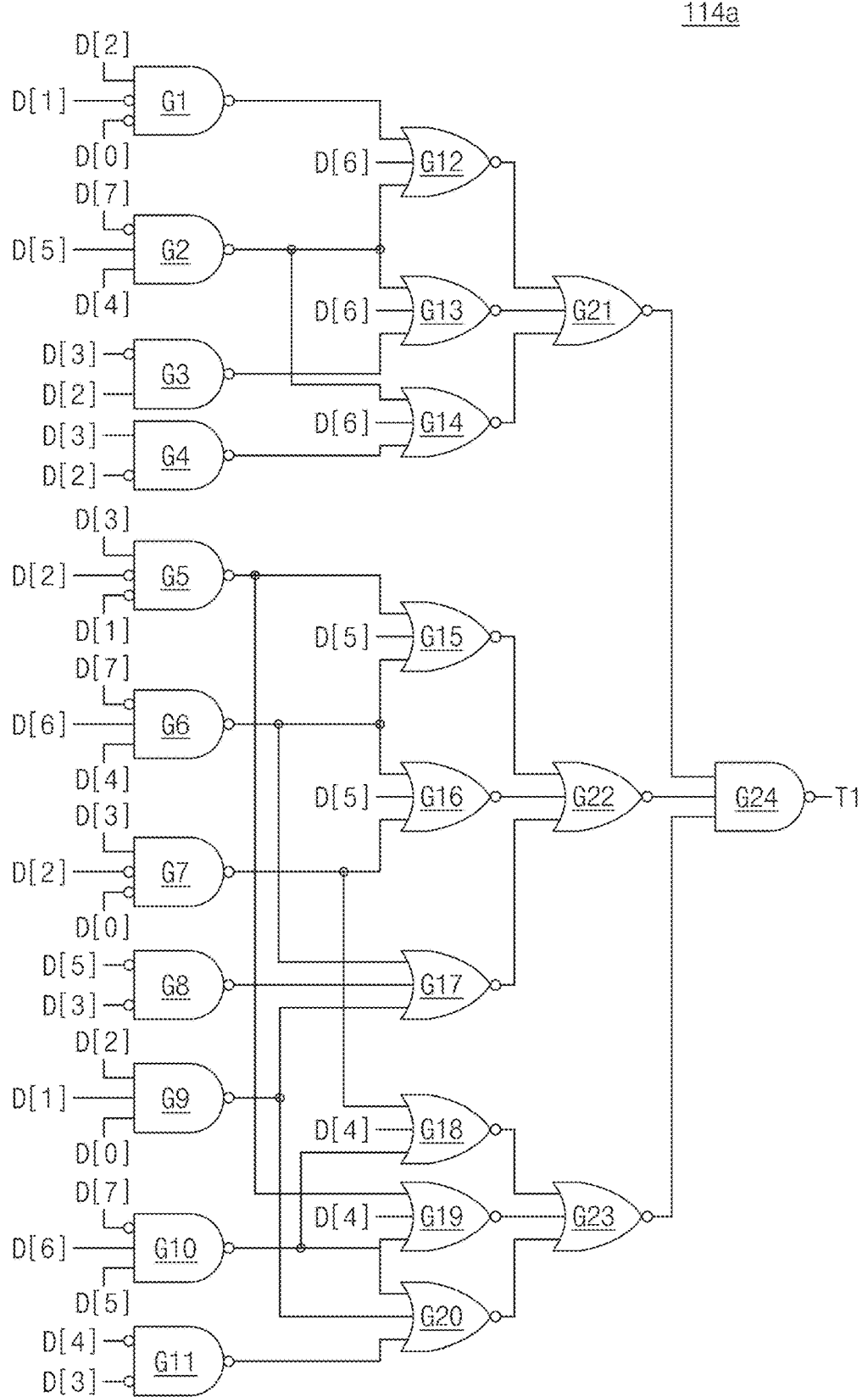
FIGS. 7 and 8 are exemplary logic circuit diagrams of a portion of a pattern detecting circuit of FIG. 2.

FIG. 7 is an exemplary logic circuit diagram of a portion of a pattern detecting circuit of FIG. 2. A pattern detecting circuit 114a illustrated in FIG. 7 may be understood as a logic circuit that generates the first detection bit T1 based on the data bits D[7:0]. Referring to FIG. 7, the pattern detecting circuit 114a may include first to twenty-fourth gates G1 to G24.

The first gate G1 performs a NAND operation on an inverted version of D[0], an inverted version of D[1], and D[2]. When D[0], D[1], and D[2] are "0", "0", and "1", respectively, the first gate G1 outputs "0"; if not, the first gate G1 outputs "1".

The second gate G2 performs a NAND operation on D[4], D[5], and an inverted version of D[7]. When D[4], D[5], and D[7] are "1", "1", and "0", respectively, the second gate G2 outputs "0"; if not, the second gate G2 outputs "1".

The third gate G3 performs a NAND operation on D[2] and an inverted version of D[3]. When D[2] and D[3] are "1" and "0", respectively, the third gate G3 outputs "0"; if not, the third gate G3 outputs "1".

The fourth gate G4 performs a NAND operation on an inverted version of D[2] and D[3]. When D[2] and D[3] are "0" and "1", respectively, the fourth gate G4 outputs "0"; if not, the fourth gate G4 outputs "1".

The fifth gate G5 performs a NAND operation on an inverted version of D[1], an inverted version of D[2], and D[3]. When D[1], D[2], and D[3] are "0", "0", and "1", respectively, the fifth gate G5 outputs "0"; if not, the fifth gate G5 outputs "1".

The sixth gate G6 performs a NAND operation on D[4], D[6], and an inverted version of D[7]. When D[4], D[6], and D[7] are "1", "1", and "0", respectively, the sixth gate G6 outputs "0"; if not, the sixth gate G6 outputs "1".

The seventh gate G7 performs a NAND operation on an inverted version of D[0], an inverted version of D[2], and D[3]. When D[0], D[2], and D[3] are "0", "0", and "1", respectively, the seventh gate G7 outputs "0"; if not, the seventh gate G7 outputs "1".

The eighth gate G8 performs a NAND operation on an inverted version of D[3] and an inverted version of D[5]. When D[3] and D[5] are "0" and "0", respectively, the eighth gate G8 outputs "0"; if not, the eighth gate G8 outputs "1".

The ninth gate G9 performs a NAND operation on D[0], D[1], and D[2]. When D[0], D[1], and D[2] are "1", "1", and "1", respectively, the ninth gate G9 outputs "0"; if not, the ninth gate G9 outputs "1".

The tenth gate G10 performs a NAND operation on D[5], D[6], and an inverted version of D[7]. When D[5], D[6], and D[7] are "1", "1", and "0", respectively, the tenth gate G10 outputs "0"; if not, the tenth gate G10 outputs "0".

The eleventh gate G11 performs a NAND operation on an inverted version of D[3] and an inverted version of D[4]. When D[3] and D[4] are "0" and "0", respectively, the eleventh gate G11 outputs "0"; if not, the eleventh gate G11 outputs "1".

The twelfth gate G12 performs a NOR operation on an output of the first gate G1, D[6], and an output of the second gate G2. When D[0:2] and D[4:7] are "001" and "1100", respectively, the twelfth gate G12 outputs "1"; if not, the twelfth gate G12 outputs "0".

The thirteenth gate G13 performs a NOR operation on the output of the second gate G2, D[6], and an output of the third gate G3. When D[2:7] are "101100", the thirteenth gate G13 outputs "1"; if not, the thirteenth gate G13 outputs "0".

The fourteenth gate G14 performs a NOR operation on the output of the second gate G2, D[6], and an output of the fourth gate G4. When D[2:7] are "011100", the fourteenth gate G14 outputs "1"; if not, the fourteenth gate G14 outputs "0".

The fifteenth gate G15 performs a NOR operation on the output of the fifth gate G5, D[5], and an output of the sixth gate G6. When D[1:7] are "0011010", the fifteenth gate G15 outputs "1"; if not, the fifteenth gate G15 outputs "0".

The sixteenth gate G16 performs a NOR operation on the output of the sixth gate G6, D[5], and an output of the seventh gate G7. When D[0] and D[2:7] are "0" and "011010", respectively, the sixteenth gate G16 outputs "1"; if not, the sixteenth gate G16 outputs "0".

The seventeenth gate G17 performs a NOR operation on the output of the sixth gate G6, an output of the eighth gate G8, and an output of the ninth gate G9. When D[0:7] are "11101010", the seventeenth gate G17 outputs "1"; if not, the seventeenth gate G17 outputs "0".

The eighteenth gate G18 performs a NOR operation on the output of the seventh gate G7, D[4], and an output of the tenth gate G10. When D[0] and D[2:7] are "0" and "010110", respectively, the eighteenth gate G18 outputs "1"; if not, the eighteenth gate G18 outputs "0".

The nineteenth gate G19 performs a NOR operation on the output of the fifth gate G5, D[4], and the output of the tenth gate G10. When D[1:7] are "0010110", the nineteenth gate G19 outputs "1"; if not, the nineteenth gate G19 outputs "0".

The twentieth gate G20 performs a NOR operation on the output of the tenth gate G10, the output of the ninth gate G9, and an output of the eleventh gate G11. When D[0:7] are "11100110", the twentieth gate G20 outputs "1"; if not, the twentieth gate G20 outputs "0".

The twenty-first gate G21 performs a NOR operation on an output of the twelfth gate G12, an output of the thirteenth gate G13, and an output of the fourteenth gate G14. When D[0:7] are "001X1100", "XX101100", or "XX011100", the X representing "0" or "1", the twenty-first gate G21 outputs "0".

The twenty-second gate G22 performs a NOR operation on an output of the fifteenth gate G15, an output of the sixteenth gate G16, and an output of the seventeenth gate G17. When D[0:7] are "X0011010", "0X011010", or "11101010", the X representing "0" or "1", the twenty-second gate G22 outputs "0".

The twenty-third gate G23 performs a NOR operation on an output of the eighteenth gate G18, an output of the nineteenth gate G19, and an output of the twentieth gate G20. When D[0:7] are "X010110", "X0010110", or "11100110", the X representing "0" or "1", the twenty-third gate G23 outputs "0".

The twenty-fourth gate G24 performs a NAND operation on an output of the twenty-first gate G21, an output of the twenty-second gate G22, and an output of the twenty-third gate G23 to output the first detection bit T1. When D[0:7] correspond to "001X1100", "XX101100", "XX011100", "X0011010", "0X011010", "11101010" (S[1:8] ="00011010"), "0X010110", "X0010110", or "11100110" (S[1:8]="00010110"), the X representing "0" or "1", the twenty-fourth gate G24 outputs "1"; when D[0:7] do not correspond to the above 9 patterns, the twenty-fourth gate G24 outputs "0". That is, the first detection bit T1 may be a result of detecting a pattern in which the number of 1s included in the first partial data bits D[7:4] is "2" in a state where the conversion bits S[9:0] have a risk pattern.

Figure 8:
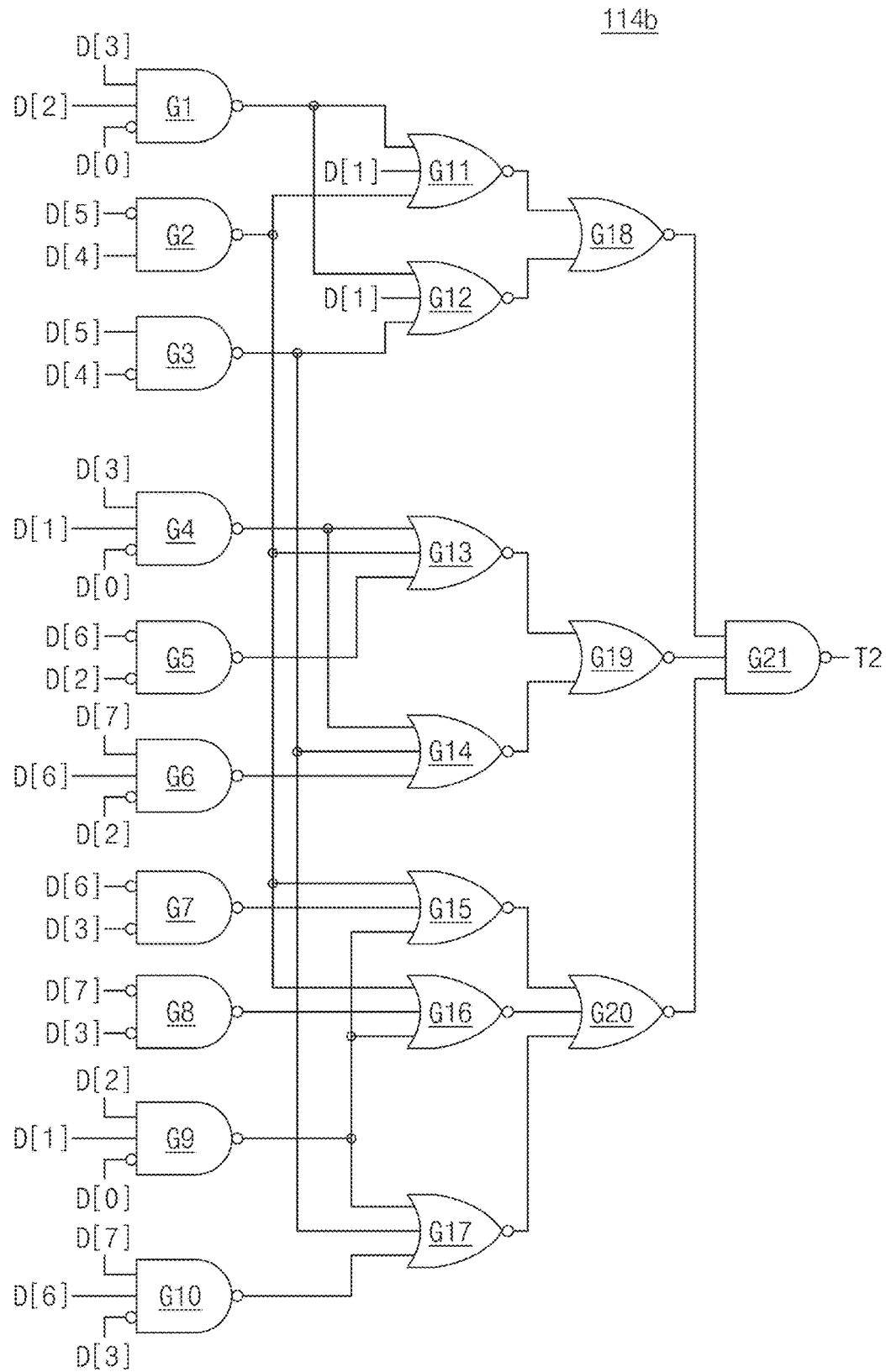

FIG. 8 is an exemplary logic circuit diagram of a portion of a pattern detecting circuit of FIG. 2. A pattern detecting circuit 114b illustrated in FIG. 8 may be understood as a logic circuit that generates the second detection bit T2 based on the data bits D[7:0]. Referring to FIG. 8, the pattern detecting circuit 114b may include first to twenty-first gates G1 to G21.

The first gate G1 performs a NAND operation on an inverted version of D[0], D[2], and D[3]. When D[0], D[2], and D[3] are "0", "1", and "1", respectively, the first gate G1 outputs "0"; if not, the first gate G1 outputs "1".

The second gate G2 performs a NAND operation on D[4] and an inverted version of D[5]. When D[4] and D[5] are "1" and "0", respectively, the second gate G2 outputs "0"; if not, the second gate G2 outputs "1".

The third gate G3 performs a NAND operation on an inverted version of D[4] and D[5]. When D[4] and D[5] are "0" and "1", respectively, the third gate G3 outputs "0"; if not, the third gate G2 outputs "1".

The fourth gate G4 performs a NAND operation on an inverted version of D[0], D[1], and D[3]. When D[0], D[1], and D[3] are "0", "1", and "1", respectively, the fourth gate G4 outputs "0"; if not, the fourth gate G4 outputs "1".

The fifth gate G5 performs a NAND operation on an inverted version of D[2] and an inverted version of D[6]. When D[2] and D[6] are "0" and "0", respectively, the fifth gate G5 outputs "0"; if not, the fifth gate G5 outputs "1".

The sixth gate G6 performs a NAND operation on an inverted version of D[2], D[6], and D[7]. When D[2], D[6], and D[7] are "0", "1", and "1", respectively, the sixth gate G6 outputs "0"; if not, the sixth gate G6 outputs "1".

The seventh gate G7 performs a NAND operation on an inverted version of D[3] and an inverted version of D[6]. When D[3] and D[6] are "0" and "0", respectively, the seventh gate G7 outputs "0"; if not, the seventh gate G7 outputs "1".

The eighth gate G8 performs a NAND operation on an inverted version of D[3] and an inverted version of D[7]. When D[3] and D[7] are "0" and "0", respectively, the eighth gate G8 outputs "0"; if not, the eighth gate G8 outputs "1".

The ninth gate G9 performs a NAND operation on an inverted version of D[0], D[1], and D[2]. When D[0], D[1], and D[2] are "0", "1", and "1", respectively, the ninth gate G9 outputs "0"; if not, the ninth gate G9 outputs "1".

The tenth gate G10 performs a NAND operation on an inverted version of D[3], D[6], and D[7]. When D[3], D[6], and D[7] are "0", "1", and "1", respectively, the tenth gate G10 outputs "0"; if not, the tenth gate G10 outputs "1".

The eleventh gate G11 performs a NOR operation on an output of the first gate G1, D[1], and an output of the second gate G2. When D[0:5] are "001110", the eleventh gate G11 outputs "1"; if not, the eleventh gate G11 outputs "0".

The twelfth gate G12 performs a NOR operation on an output of the first gate G1, D[1], and an output of the third gate G3. When D[0:5] are "001101", the twelfth gate G12 outputs "1"; if not, the twelfth gate G12 outputs "0".

The thirteenth gate G13 performs a NOR operation on an output of the fourth gate G4, the output of the second gate G2, and an output of the fifth gate G5. When D[0:6] are "0101100", the thirteenth gate G13 outputs "1"; if not, the thirteenth gate G14 outputs The fourteenth gate G14 performs a NOR operation on an output of the fourth gate G4, the output of the third gate G3, and an output of the sixth gate G6. When D[0:7] are "01010111", the fourteenth gate G14 outputs "1"; if not, the fourteenth gate G14 outputs "0".

The fifteenth gate G15 performs a NOR operation on the output of the second gate G2, an output of the seventh gate G7, and an output of the ninth gate G9. When D[0:6] are "0110100", the fifteenth gate G15 outputs "1"; if not, the fifteenth gate G15 outputs "0".

The sixteenth gate G16 performs a NOR operation on the output of the second gate G2, an output of the eighth gate G8, and an output of the ninth gate G9. When D[0:5] are "011010" and D[7] is "0", the sixteenth gate G16 outputs "1"; if not, the sixteenth gate G16 outputs "0".

The seventeenth gate G17 performs a NOR operation on the output of the ninth gate G9, the output of the third gate G3, and an output of the tenth gate G10. When D[0:7] are "01100111", the seventeenth gate G17 outputs "1"; if not, the seventeenth gate G17 outputs "0".

The eighteenth gate G18 performs a NOR operation on the output of the eleventh gate G11 and an output of the twelfth gate G12. When D[0:7] are "001110XX" or "01010111", the X representing "0" or "1", the eighteenth gate G18 outputs "0".

The nineteenth gate G19 performs a NOR operation on an output of the thirteenth gate G13 and an output of the fourteenth gate G14. When D[0:7] are "0101100X" or "001101XX", the X representing "0" or "1", the nineteenth gate G19 outputs "0".

The twentieth gate G20 performs a NOR operation on an output of the fifteenth gate G15, an output of the sixteenth gate G16, and an output of the seventeenth gate G17. When D[0:7] are "0110100X", "011010X0", or "01100111", the X representing "0" or "1", the twentieth gate G20 outputs "0".

The twenty-first gate G21 performs a NAND operation on an output of the eighteenth gate G18, an output of the nineteenth gate G19, and an output of the twentieth gate G20 to output the second detection bit T2. When D[0:7] correspond to "001110XX", "001101XX", "0101100X", "01010111" (S[1:8]="01011000"), "0110100X", "011010X0", or "01100111" (S[1:8]="01101000"), the X representing "0" or "1", the twenty-first gate G21 outputs "1"; when D[0:7] do not correspond to the above 7 patterns, the twenty-first gate G21 outputs "0". That is, the second detection bit T2 may be a result of detecting a pattern in which the number of is included in the second partial data bits D[3:0] is "2" in a state where the conversion bits S[9:0] have a risk pattern.

Figure 9:
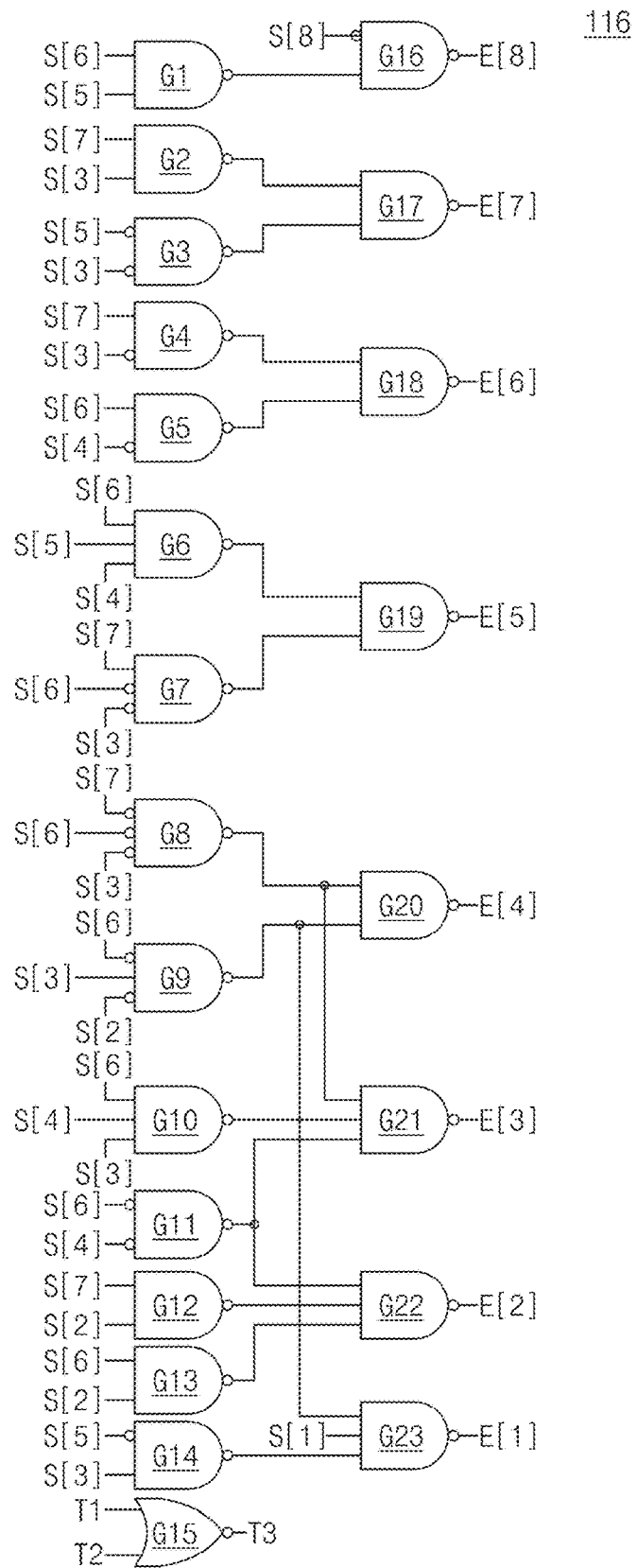
FIG. 9 is an exemplary logic circuit diagram of a second converting circuit of FIG. 2.

FIG. 9 is an exemplary logic circuit diagram of a portion of a second converting circuit of FIG. 2. The second converting circuit 116 illustrated in FIG. 9 may be understood as a logic circuit that generates the replacement bits E[8:1] and the third detection bit T3 based on the conversion bits S[9:0] and the first and second detection bits T1 and T2. Referring to FIG. 9, the second converting circuit 116 may include first to twenty-third gates G1 to G23.

The first gate G1 performs a NAND operation on S[5] and S[6]. When S[5] and S[6] are "1" and "1", respectively, the first gate G1 outputs "0"; if not, the first gate G1 outputs "1".

The second gate G2 performs a NAND operation on S[3] and S[7]. When S[3] and S[7] are "1" and "1", respectively, the second gate G2 outputs "0"; if not, the second gate G2 outputs "1".

The third gate G3 performs a NAND operation on an inverted version of D[3] and an inverted version of D[5]. When S[3] and S[5] are "0" and "0", respectively, the third gate G3 outputs "0"; if not, the third gate G3 outputs "1".

The fourth gate G4 performs a NAND operation on an inverted version of S[3] and S[7]. When S[3] and S[7] are "0" and "1", respectively, the fourth gate G4 outputs "0"; if not, the fourth gate G4 outputs "1".

The fifth gate G5 performs a NAND operation on an inverted version of S[4] and S[6]. When S[4] and S[6] are "0" and "1", respectively, the fifth gate G5 outputs "0"; if not, the fifth gate G5 outputs "1".

The sixth gate G6 performs a NAND operation on S[4], S[5], and S[6]. When S[4], S[5], and S[6] are "1", "1", and "1", respectively, the sixth gate G6 outputs "0"; if not, the sixth gate G6 outputs "1".

The seventh gate G7 performs a NAND operation on an inverted version of S[3], an inverted version of S[6], and S[7]. When S[3], S[6], and S[7] are "0", "0", and "1", respectively, the seventh gate G7 outputs "0"; if not, the seventh gate G7 outputs "1".

The eighth gate G8 performs a NAND operation on an inverted version of S[3], an inverted version of S[6], and an inverted version of S[7]. When S[3], S[6], and S[7] are "0", "0", and "0", respectively, the eighth gate G8 outputs "0"; if not, the eighth gate G8 outputs "1".

The ninth gate G9 performs a NAND operation on an inverted version of S[2], S[3], and an inverted version of S[6]. When S[2], S[3], and S[6] are "0", "1", and "0", respectively, the ninth gate G9 outputs "0"; if not, the ninth gate G9 outputs "1".

The tenth gate G10 performs a NAND operation on S[3], S[4], and S[6]. When S[3], S[4], and S[6] are "1", "1", and "1", respectively, the tenth gate G10 outputs "0"; if not, the tenth gate G10 outputs "1".

The eleventh gate G11 performs a NAND operation on an inverted version of D[4] and an inverted version of D[6]. When S[4] and S[6] are "0" and "0", respectively, the eleventh gate G11 outputs "0"; if not, the eleventh gate G11 outputs "1".

The twelfth gate G12 performs a NAND operation on S[2] and S[7]. When S[2] and S[7] are "1" and "1", respectively, the twelfth gate G12 outputs "0"; if not, the twelfth gate G12 outputs "1".

The thirteenth gate G13 performs a NAND operation on S[2] and S[6]. When S[2] and S[6] are "1" and "1", respectively, the thirteenth gate G13 outputs "0"; if not, the thirteenth gate G13 outputs "1".

The fourteenth gate G14 performs a NAND operation on S[3] and an inverted version of S[5]. When S[3] and S[5] are "1" and "0", respectively, the fourteenth gate G14 outputs "0"; if not, the fourteenth gate G14 outputs "1".

The fifteenth gate G15 performs a NOR operation on the first detection bit T1 and the second detection bit T2 to output the third detection bit T3. When the first detection bit T1 and the second detection bit T2 are "0" and "0", respectively, the fifteenth gate G15 outputs "1"; if not, the fifteenth gate G15 outputs "0". That is, the third detection bit T3 may have a logical value of "0" when D[0:7] correspond to "001X1100", "XX101100", "XX011100", "X0011010", "0X011010", "11101010", "0X010110", "X0010110", "11100110", "001110XX", "001101XX", "0101100X", "01010111", "0110100X", "011010X0", or "01100111", the X representing "0" or "1", and may have a logical value of "1" when D[1:7] do not correspond to the above patterns. The above patterns are defined as the risk pattern described above.

The sixteenth gate G16 performs a NAND operation on an output of the first gate G1 and an inverted version of S[8] to output E[8]. When S[8] is "1" or S[5] and S[6] are "1" and "1" respectively, E[8] is "1".

The seventeenth gate G17 performs a NAND operation on an output of the second gate G2 and an output of the third gate G3 to output E[7]. When S[3] and S[7] are "1" and "1" respectively or S[3] and S[5] are "0" and "0" respectively, E[7] is "1".

The eighteenth gate G18 performs a NAND operation on an output of the fourth gate G4 and an output of the fifth gate G5 to output E[6]. When S[3] and S[7] are "0" and "1" respectively or S[4] and S[6] are "0" and "1" respectively, E[6] is "1".

The nineteenth gate G19 performs a NAND operation on an output of the sixth gate G6 and an output of the seventh gate G7 to output E[5]. When S[4], S[5], and S[6] are "1", "1", and "1" respectively or S[3], S[6], and S[7] are "0", "0", and "1" respectively, E[5] is "1".

The twentieth gate G20 performs a NAND operation on an output of the eighth gate G8 and an output of the ninth gate G9 to output E[4]. When S[3], S[6], and S[7] are "0", "0", and "0" respectively or S[2], S[3], and S[6] are "0", "1", and "0" respectively, E[4] is "1".

The twenty-first gate G21 performs a NAND operation on the output of the eighth gate G8, an output of the tenth gate G10, and an output of the eleventh gate G11 to output E[3]. When S[3], S[6], and S[7] are "0", "0", and "0" respectively, when S[3], S[4], and S[6] are "1", "1", and "1", when S[4] and S[6] are "0" and "0" respectively, E[3] is "1".

The twenty-second gate G22 performs a NAND operation on the output of the eleventh gate G11, an output of the twelfth gate G12, and an output of the thirteenth gate G13 to output E[2]. When S[4] and S[6] are "0" and "0" respectively, when S[2] and S[7] are "1" and "1" respectively, or when S[2] and S[6] are "0" and "0" respectively, E[2] is "1".

The twenty-third gate G23 performs a NAND operation on the output of the ninth gate G9, S[1], and an output of the fourteenth gate G14 to output E[1]. When S[3], S[6], and S[7] are "0", "0", and "0" respectively, when S[1] is "0", or when S[3] and S[5] are "1" and "0" respectively, E[1] is "1".

When the conversion bits S[9:0] have a risk pattern, the replacement bits E[8:1] generated through the second converting circuit 116 are converted to not have the risk pattern. For example, when S[8:1] are "00101100", the replacement bits E[8:1] are "01000101"; when S[8:1] are "00111100", the replacement bits E[8:1] are "10010101". That is, when the conversion bits S[9:0] have a risk pattern, the replacement bits E[8:1] may be generated such that logical values of "1" are dispersed between bits.

Figure 10:
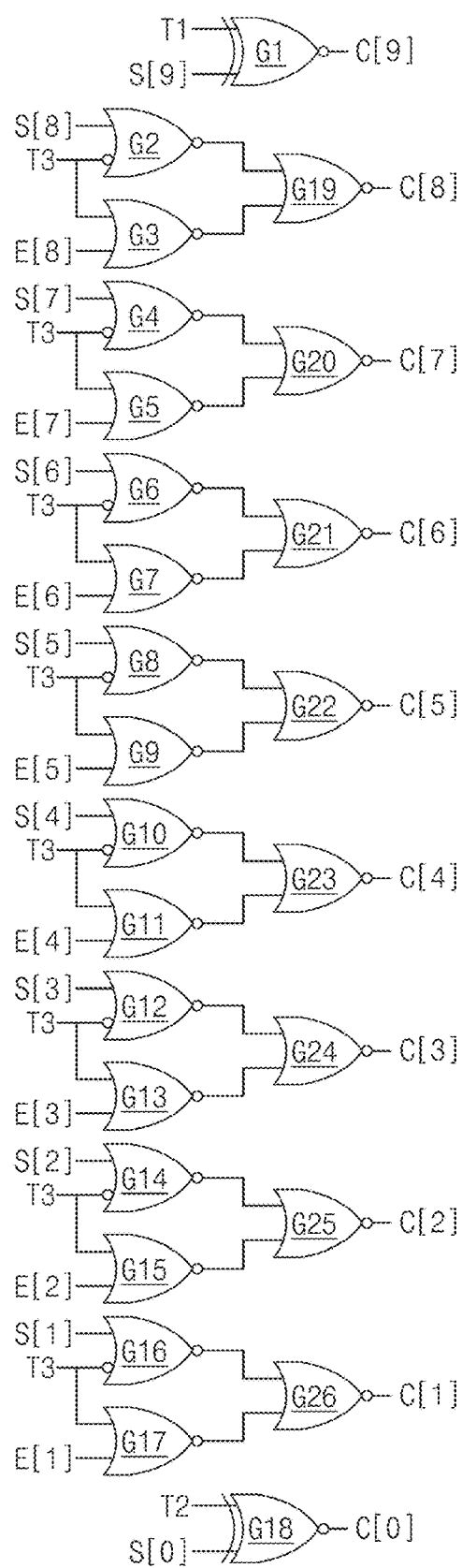
FIG. 10 is an exemplary logic circuit diagram of a portion of a third converting circuit of FIG. 2.

FIG. 10 is an exemplary logic circuit diagram of a portion of a third converting circuit of FIG. 2. The third converting circuit 117 illustrated in FIG. 10 may be understood as a logic circuit that generates the code bits C[9:0] to be output to the channels 130 based on the conversion bits S[9:0], the replacement bits E[8:1], and the first, second, and third detection bits T1, T2, and T3. Referring to FIG. 10, the third converting circuit 117 may include first to twenty-sixth gates G1 to G26.

The first gate G1 performs an XNOR operation on the first detection bit T1 and S[9] to generate C[9]. When a logical value of the first detection bit T1 is different from a logical value of S[9], C[9] is "0". When the data bits D[0:7] corresponds to "001X1100", "XX101100", "XX011100", "X0011010", "0X011010", "11101010", "0X010110", "X0010110", or "11100110", the X representing "0" or "1", the first detection bit T1 is "1"; if not, the first detection bit T1 is "0". Accordingly, when D[0:7] have the above pattern, C[9] is identical to S[9]. In some example embodiments, because two bits of the first partial data bits D[7:4] are "1", S[9] is "0", and C[9] is "0". When D[0:7] do not have the above pattern, C[9] corresponds to an inverted version of S[9].

The second gate G2, the third gate G3, and the nineteenth gate G19 generate C[8]. The second gate G2 performs a NOR operation on S[8] and an inverted version of the third detection bit T3. The third gate G3 performs a NOR operation on E[8] and the third detection bit T3. The nineteenth gate G19 performs a NOR operation on an output of the second gate G2 and an output of the third gate G3. As a result, when the third detection bit T3 is "1", that is, when a risk pattern does not exist, C[8] is identical to S[8]. When the third detection bit T3 is "0", that is, when a risk pattern exists, C[8] is identical to E[8].

The fourth gate G4, the fifth gate G5, and the twentieth gate G20 generate C[7], and a configuration of the fourth gate G4, the fifth gate G5, and the twentieth gate G20 is substantially identical to the configuration of the second gate G2, the third gate G3, and the nineteenth gate G19. As a result, when the third detection bit T3 is "1", C[7] is identical to S[7]. When the third detection bit T3 is "0", C[7] is identical to E[7].

The sixth gate G6, the seventh gate G7, and the twenty-first gate G21 generate C[6]. As a result, when the third detection bit T3 is "1", C[6] is identical to S[6]. When the third detection bit T3 is "0", C[6] is identical to E[6].

The eighth gate G8, the ninth gate G9, and the twenty-second gate G22 generate C[5]. As a result, when the third detection bit T3 is "1", C[5] is identical to S[5]. When the third detection bit T3 is "0", C[5] is identical to E[5].

The tenth gate G10, the eleventh gate G11, and the twenty-third gate G23 generate C[4]. As a result, when the third detection bit T3 is "1", C[4] is identical to S[4]. When the third detection bit T3 is "0", C[4] is identical to E[4].

The twelfth gate G12, the thirteenth gate G13, and the twenty-fourth gate G24 generate C[3]. As a result, when the third detection bit T3 is "1", C[3] is identical to S[3]. When the third detection bit T3 is "0", C[3] is identical to E[3].

The fourteenth gate G14, the fifteenth gate G15, and the twenty-fifth gate G25 generate C[2]. As a result, when the third detection bit T3 is "1", C[2] is identical to S[2]. When the third detection bit T3 is "0", C[2] is identical to E[2].

The sixteenth gate G16, the seventeenth gate G17, and the twenty-sixth gate G26 generate C[1]. As a result, when the third detection bit T3 is "1", C[1] is identical to S[1]. When the third detection bit T3 is "0", C[1] is identical to E[1].

The eighteenth gate G18 performs an XNOR operation on the second detection bit T2 and S[0] to generate C[0]. When a logical value of the second detection bit T2 is different from a logical value of S[0], C[0] is "0". When the data bits D[0:7] corresponds to "001110XX", "001101XX", "0101100X", "01010111", "0110100X", "011010X0", or "01100111", the X representing "0" or "1", the second detection bit T2 is "1"; if not, the second detection bit T2 is "0". Accordingly, when D[0:7] have the above pattern, C[0] is identical to S[0]. In some example embodiments, because two bits of the second partial data bits D[3:0] are "1", S[0] is "0", and C[0] is "0". When D[0:7] do not have the above pattern, C[0] corresponds to an inverted version of S[0].

Figure 11:
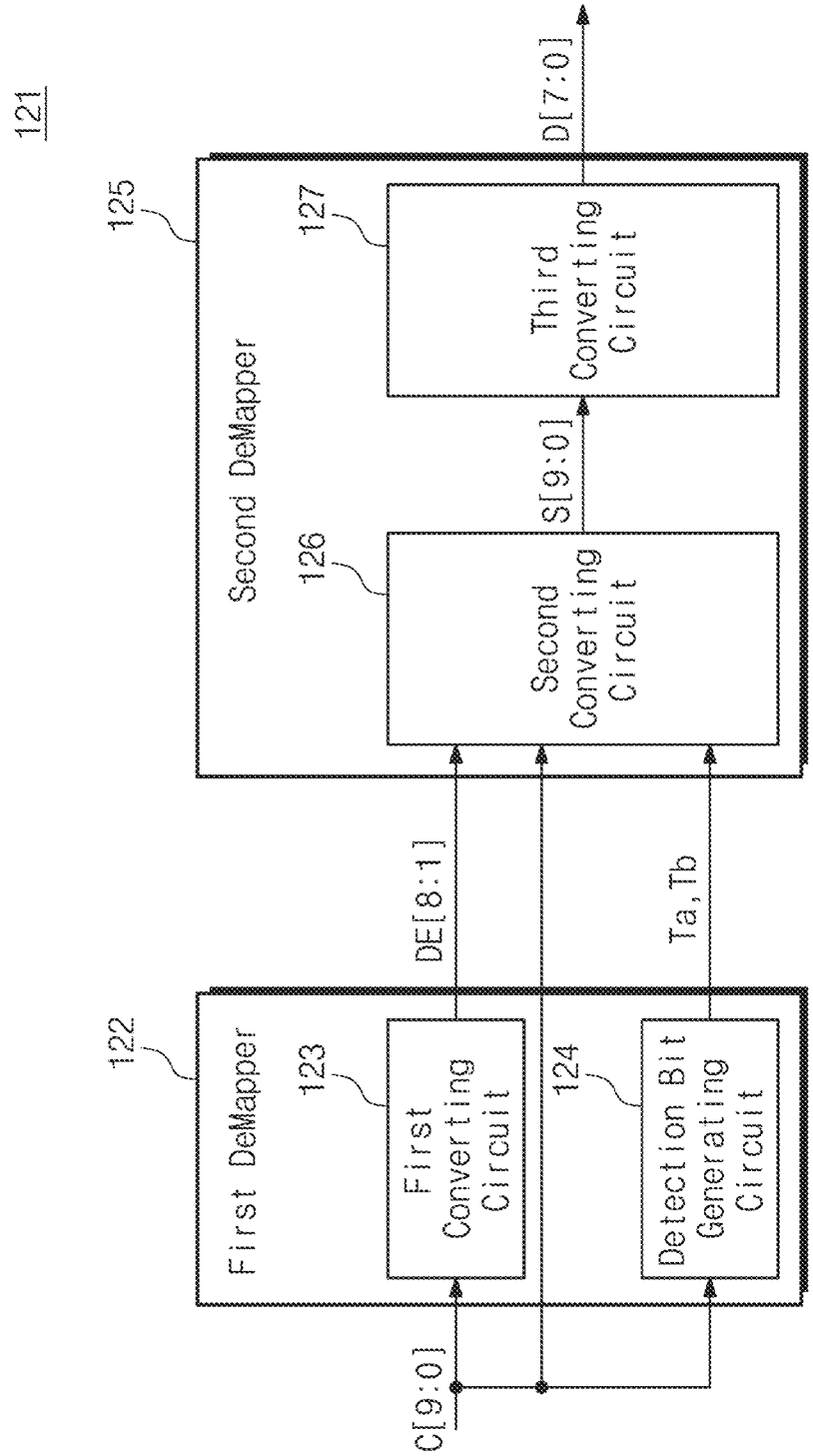
FIG. 11 is an exemplary block diagram of a decoder of FIG. 1.

FIG. 11 is an exemplary block diagram of a decoder of FIG. 1. The decoder 121 of FIG. 11 may decode the 10 code bits C[9:0] to the 8 data bits D[7:0]. In some example embodiments, the number of channels 130 of FIG. 1 may be "10". Referring to FIG. 11, the decoder 121 includes a first demapper 122 and a second demapper 125.

The first demapper 122 may generate replacement bits DE[8:1] and detection bits Ta and Tb, based on the code bits C[9:0]. The first demapper 122 may include a first converting circuit 123 for generating the replacement bits DE[8:1] and a detection bit generating circuit 124 for generating the detection bits Ta and Tb.

The first converting circuit 123 may generate the replacement bits DE[8:1] based on the code bits C[9:0]. When a risk pattern is present in the conversion bits S[9:0], the risk pattern is converted into a replacement pattern by the encoder 111 described above. In some example embodiments, the decoder 121 needs to again convert the replacement pattern into the risk pattern. The first converting circuit 123 may generate the replacement bits DE[8:1] such that the code bits C[9:0] generated by the replacement pattern are converted into the conversion bits S[9:0].

The detection bit generating circuit 124 may generate the first detection bit Ta and the second detection bit Tb, based on a pattern of the code bits C[9:0]. The detection bit generating circuit 124 may generate the first detection bit Ta, based on a pattern of C[9:5] of the code bits C[9:0]. The detection bit generating circuit 124 may generate the second detection bit Tb, based on a pattern of C[4:0] of the code bits C[9:0]. The first detection bit Ta and the second detection bit Tb may be used to determine whether the code bits C[9:0] correspond to a result of replacing a risk pattern at the encoder 111.

The second demapper 125 may generate the data bits D[7:0], based on the code bits C[9:0], the replacement bits DE[8:1], and the first and second detection bits Ta and Tb. The second demapper 125 may include a second converting circuit 126 for generating the conversion bits S[9:0] and a third converting circuit 127 for generating the data bits D[7:0].

The second converting circuit 126 may generate the conversion bits S[9:0], based on the code bits C[9:0], the replacement bits DE[8:1], and the first and second detection bits Ta and Tb. When the first and second detection bits Ta and Tb indicate that the code bits C[9:0] correspond to a result of replacing a risk pattern with the replacement pattern at the encoder 111, the second converting circuit 126 may convert the replacement pattern into the risk pattern for the purpose of recovering the data bits D[7:0]. When the first and second detection bits Ta and Tb indicate that the code bits C[9:0] do not correspond to the result of replacing the risk pattern at the encoder 111, the second converting circuit 126 may not apply the replacement bits DE[8:1] to the conversion bits S[9:0].

The third converting circuit 127 may convert the conversion bits S[9:0] into the data bits D[7:0]. The third converting circuit 127 may convert S[8:5] into the first partial data bits D[7:4], based on S[9] of the conversion bits S[9:0]. The third converting circuit 127 may convert S[4:1] into the second partial data bits D[3:0], based on S[0] of the conversion bits S[9:0].

Figure 12:
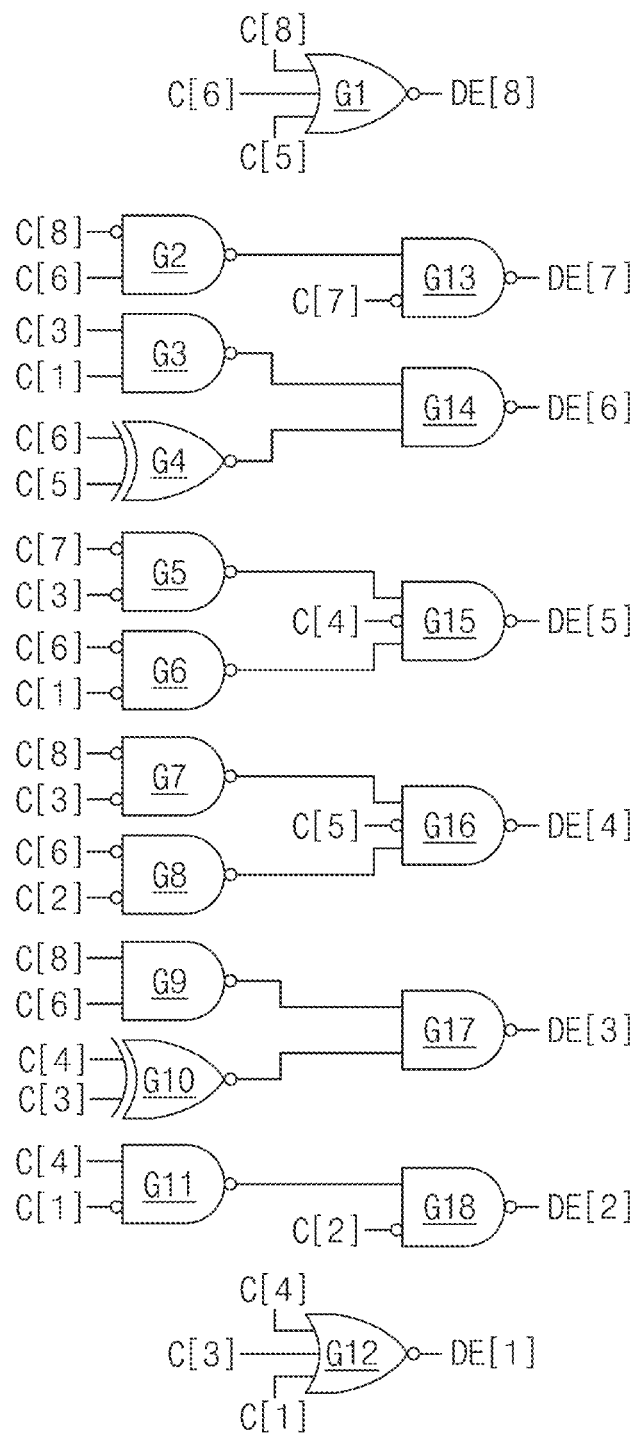
FIG. 12 is an exemplary logic circuit diagram of a portion of a first converting circuit of FIG. 11.

FIG. 12 is an exemplary logic circuit diagram of a portion of a first converting circuit of FIG. 11. The first converting circuit 123 illustrated in FIG. 12 may be understood as a logic circuit that generates the first to eighth replacement bits DE[8:1] based on the code bits C[9:0] received from the channels 130. The code bits C[9:0] correspond to the code bits C[9:0] described above. Referring to FIG. 12, the first converting circuit 123 may include first to eighteenth gates G1 to G18.

The first gate G1 performs a NOR operation on C[5], C[6], and C[8] to generate DE[8]. When C[8], C[6], and C[5] are "0", "0", and "0" respectively, DE[8] is "1".

The second gate G2 and the thirteenth gate G13 generate DE[7]. The second gate G2 performs a NAND operation on an inverted version of C[8] and C[6]. The thirteenth gate G13 performs a NAND operation on an output of the second gate G2 and an inverted version of C[7]. When C[8] and C[6] are "0" and "1" respectively or C[7] is "1", DE[7] is "1".

The third gate G3, the fourth gate G4, and the fourteenth gate G14 generate DE[6]. The third gate G3 performs a NAND operation on C[1] and C[3]. The fourth gate G4 performs an XNOR operation on C[5] and C[6]. The fourteenth gate G14 performs a NAND operation on an output of the third gate G3 and an output of the fourth gate G4. When C[3] and C[1] are "1" and "1" respectively or C[5] and C[6] are different, DE[6] is "1".

The fifth gate G5, the sixth gate G6, and the fifteenth gate G15 generate DE[5]. The fifth gate G5 performs a NAND operation on an inverted version of C[7] and an inverted version of C[3]. The sixth gate G6 performs a NAND operation on an inverted version of C[6] and an inverted version of C[1]. The fifteenth gate G15 performs a NAND operation on an output of the fifth gate G5, C[4], and an output of the sixth gate G6. When C[7] and C[3] are "0" and "0" respectively, C[4] is "1", or C[6] and C[1] are "0" and "0" respectively, DE[5] is "1".

The seventh gate G7, the eighth gate G8, and the sixteenth gate G16 generate DE[4]. The seventh gate G7 performs a NAND operation on an inverted version of C[8] and an inverted version of C[3]. The eighth gate G8 performs a NAND operation on an inverted version of C[6] and an inverted version of C[2]. The sixteenth gate G16 performs a NAND operation on an output of the seventh gate G7, an inverted version of C[5], and an output of the eighth gate G8. When C[8] and C[3] are "0" and "0" respectively, C[5] is "1", or C[6] and C[2] are "0" and "0" respectively, DE[4] is "1".

The ninth gate G9, the tenth gate G10, and the seventeenth gate G17 generate DE[3]. The ninth gate G9 performs a NAND operation on C[8] and C[6]. The tenth gate G10 performs an XNOR operation on C[4] and C[3]. The seventeenth gate G17 performs a NAND operation on an output of the ninth gate G9 and an output of the tenth gate G10. When C[8] and C[6] are "1" and "1" respectively or C[4] and C[3] are different, DE[3] is "1".

The eleventh gate G11 and the eighteenth gate G18 generate DE[2]. The eleventh gate G11 performs a NAND operation on an inverted version of C[1] and C[4]. The eighteenth gate G18 performs a NAND operation on an output of the eleventh gate G11 and an inverted version of C[2]. When C[1] and C[4] are "0" and "1" respectively or C[2] is "1", DE[2] is "1".

The twelfth gate G12 performs a NOR operation on C[1], C[3], and C[4] to generate DE[1]. When C[1], C[3], and C[4] are "0", "0", and "0" respectively, DE[1] is "1".

Figure 13:
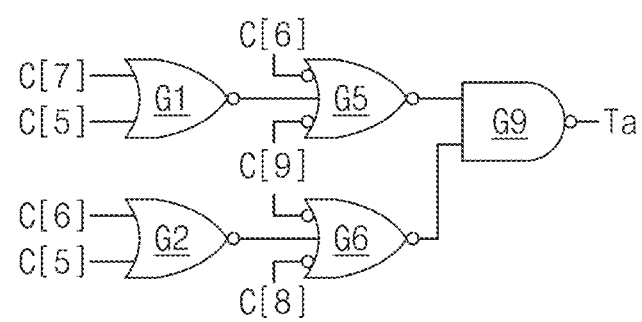
FIG. 13 is an exemplary logic circuit diagram of a detection bit generating circuit of FIG. 11.
Figure 13:
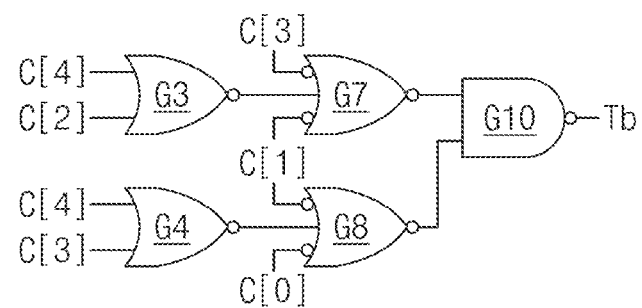

FIG. 13 is an exemplary logic circuit diagram of a detection bit generating circuit of FIG. 11. The detection bit generating circuit 124 illustrated in FIG. 13 may be understood as a logic circuit that generates the first and second detection bits Ta and Tb based on based on the code bits C[9:0] received from the channels 130. Referring to FIG. 13, the detection bit generating circuit 124 may include first to tenth gates G1 to G10.

The first gate G1, the second gate G2, the fifth gate G5, the sixth gate G6, and the ninth gate G9 generate the first detection bit Ta. The first gate G1 performs a NOR operation on C[7] and C[5]. The second gate G2 performs a NOR operation on C[6] and C[5]. The fifth gate G5 performs a NOR operation on an inverted version of C[6], an output of the first gate G1, and an inverted version of C[9]. The sixth gate G6 performs a NOR operation on an inverted version of C[8], an output of the second gate G2, and an inverted version of C[9]. The ninth gate G9 performs a NAND operation on an output of the fifth gate G5 and an output of the sixth gate G6. When C[5] and C[7] are "0" and "0" respectively, C[6] is "0", C[8] is "0", or C[9] is "0", the first detection bit Ta is "1".

The third gate G3, the fourth gate G4, the seventh gate G7, the eighth gate G8, and the tenth gate G10 generate the second detection bit Tb. The third gate G3 performs a NOR operation on C[4] and C[2]. The fourth gate G4 performs a NOR operation on C[4] and C[3]. The seventh gate G7 performs a NOR operation on an inverted version of C[3], an output of the third gate G3, and an inverted version of C[1]. The eighth gate G8 performs a NOR operation on an inverted version of C[1], an output of the fourth gate G4, and an inverted version of C[0]. The tenth gate G10 performs a NAND operation on an output of the seventh gate G7 and an output of the eighth gate G8. When C[2] and C[4] are "0" and "0" respectively, C[3] is "0", C[1] is "0", or C[0] is "0", the second detection bit Tb is "1".

Figure 14:
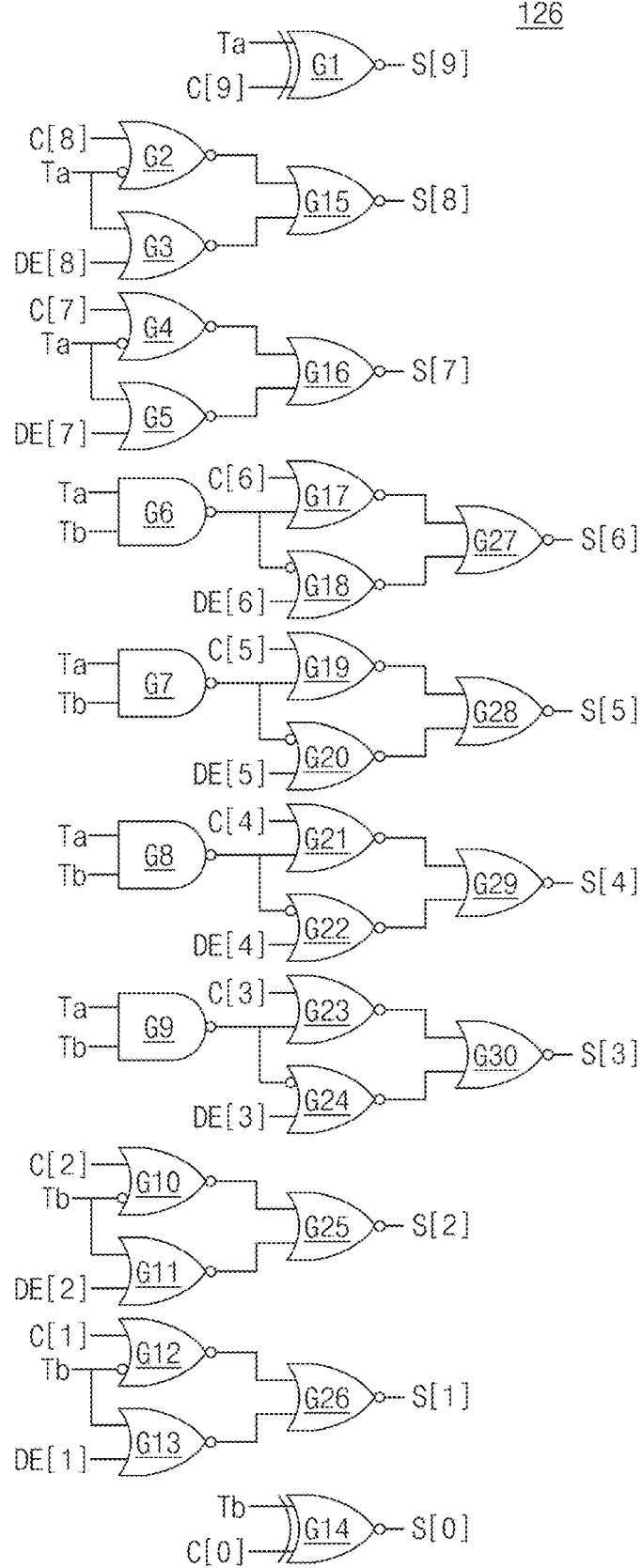
FIG. 14 is an exemplary logic circuit diagram of a second converting circuit of FIG. 11.

FIG. 14 is an exemplary logic circuit diagram of a second converting circuit of FIG. 11. The second converting circuit 126 illustrated in FIG. 14 may be understood as a logic circuit that generates the conversion bits S[9:0], based on the code bits C[9:0], the replacement bits DE[8:1], and the first and second detection bits Ta and Tb. The conversion bits S[9:0] correspond to the conversion bits S[9:0] described above. Referring to FIG. 14, the second converting circuit 126 may include first to thirtieth gates G1 to G30.

The first gate G1 performs an XNOR operation on the first detection bit Ta and C[9] to generate S[9]. When the first detection bit Ta and C[9] are different, S[9] is "0"; when the first detection bit Ta and C[9] are identical, S[9] is "1".

The second gate G2, the third gate G3, and the fifteenth gate G15 generate S[8]. The second gate G2 performs a NOR operation on C[8] and an inverted version of the first detection bit Ta. The third gate G3 performs a NOR operation on DE[8] and the first detection bit Ta. The fifteenth gate G15 performs a NOR operation on an output of the second gate G2 and an output of the third gate G3. When the first detection bit Ta is "1", S[8] is identical to C[8]. When the first detection bit Ta is "0", S[8] is identical to DE[8].

The fourth gate G4, the fifth gate G5, and the sixteenth gate G16 generate S[7]. The fourth gate G4 performs a NOR operation on C[7] and an inverted version of the first detection bit Ta. The fifth gate G5 performs a NOR operation on DE[7] and the first detection bit Ta. The sixteenth gate G16 performs a NOR operation on an output of the fourth gate G4 and an output of the fifth gate G5. When the first detection bit Ta is "1", S[7] is identical to C[7]. When the first detection bit Ta is "0", S[7] is identical to DE[7].

The sixth gate G6, the seventeenth gate G17, the eighteenth gate G18, and the twenty-seventh gate G27 generate S[6]. The sixth gate G6 performs a NAND operation on the first detection bit Ta and the second detection bit Tb. The seventeenth gate G17 performs a NOR operation on an output of the sixth gate G6 and C[6]. The eighteenth gate G18 performs a NOR operation on an inverted version of the output of the sixth gate G6 and DE[6]. The twenty-seventh gate G27 performs a NOR operation on an output of the seventeenth gate G17 and an output of the eighteenth gate G18. When the first detection bit Ta and the second detection bit Tb are "1" and "1" respectively, S[6] is identical to C[6]; if not, S[6] is identical to DE[6].

The seventh gate G7, the nineteenth gate G19, the twentieth gate G20, and the twenty-eighth gate G28 generate S[5]. The seventh gate G7 performs a NAND operation on the first detection bit Ta and the second detection bit Tb. The nineteenth gate G19 performs a NOR operation on an output of the seventh gate G7 and C[5]. The twentieth gate G20 performs a NOR operation on an inverted version of the output of the seventh gate G7 and DE[5]. The twenty-eighth gate G28 performs a NOR operation on an output of the nineteenth gate G19 and an output of the twentieth gate G20. When the first detection bit Ta and the second detection bit Tb are "1" and "1" respectively, S[5] is identical to C[5]; if not, S[5] is identical to DE[5].

The eighth gate G8, the twenty-first gate G21, the twenty-second gate G22, and the twenty-ninth gate G29 generate S[4]. The eighth gate G8 performs a NAND operation on the first detection bit Ta and the second detection bit Tb. The twenty-first gate G21 performs a NOR operation on an output of the eighth gate G8 and C[4]. The twenty-second gate G22 performs a NOR operation on an inverted version of the output of the eighth gate G8 and DE[4]. The twenty-ninth gate G29 performs a NOR operation on an output of the twenty-first gate G21 and an output of the twenty-second gate G22. When the first detection bit Ta and the second detection bit Tb are "1" and "1" respectively, S[4] is identical to C[4]; if not, S[4] is identical to DE[4].

The ninth gate G9, the twenty-third gate G23, the twenty-fourth gate G24, and the thirtieth gate G30 generate S[3]. The ninth gate G9 performs a NAND operation on the first detection bit Ta and the second detection bit Tb. The twenty-third gate G23 performs a NOR operation on an output of the ninth gate G9 and C[3]. The twenty-fourth gate G24 performs a NOR operation on an inverted version of the output of the ninth gate G9 and DE[3]. The thirtieth gate G30 performs a NOR operation on an output of the twenty-third gate G23 and an output of the twenty-fourth gate G24. When the first detection bit Ta and the second detection bit Tb are "1" and "1" respectively, S[3] is identical to C[3]; if not, S[3] is identical to DE[3].

The tenth gate G10, the eleventh gate G11, and the twenty-fifth gate G25 generate S[2]. The tenth gate G10 performs a NOR operation on C[2] and an inverted version of the second detection bit Tb. The eleventh gate G11 performs a NOR operation on DE[2] and the second detection bit Tb. The twenty-fifth gate G25 performs a NOR operation on an output of the tenth gate G10 and an output of the eleventh gate G11. When the second detection bit Tb is "1", S[2] is identical to C[2]. When the second detection bit Tb is "0", S[2] is identical to DE[2].

The twelfth gate G12, the thirteenth gate G13, and the twenty-sixth gate G26 generate S[1]. The twelfth gate G12 performs a NOR operation on C[1] and the inverted version of the second detection bit Tb. The thirteenth gate G13 performs a NOR operation on DE[1] and the second detection bit Tb. The twenty-sixth gate G26 performs a NOR operation on an output of the twelfth gate G12 and an output of the thirteenth gate G13. When the second detection bit Tb is "1", S[1] is identical to C[1]. When the second detection bit Tb is "0", S[1] is identical to DE[1].

The fourteenth gate G14 performs an XNOR operation on the second detection bit Tb and C[0] to generate S[0]. When the second detection bit Tb and C[0] are different, S[0] is "0"; when the second detection bit Tb and C[0] are identical, S[0] is "1".

Figure 15:
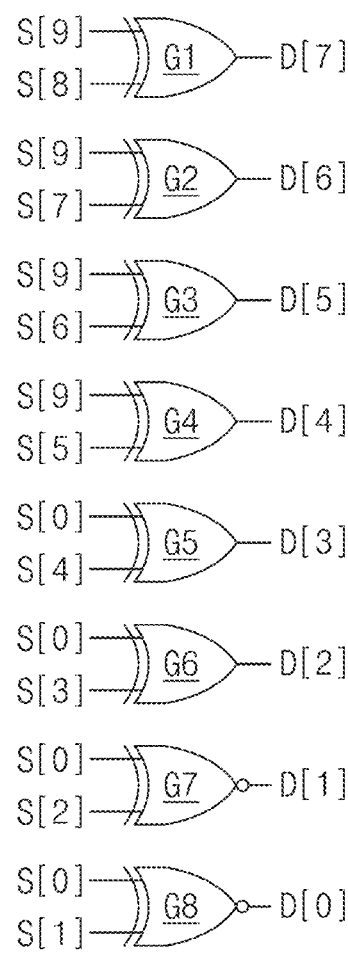
FIG. 15 is an exemplary logic circuit diagram of a third converting circuit of FIG. 11.

FIG. 15 is an exemplary logic circuit diagram of a third converting circuit of FIG. 11. The third converting circuit 127 illustrated in FIG. 15 may be understood as a logic circuit that generates the data bits D[7:0] based on the conversion bits S[9:0] The data bits D[7:0] correspond to the data bits D[7:0] described above. Referring to FIG. 15, the third converting circuit 127 may include first to eighth gates G1 to G8.

The first gate G1 performs an XOR operation on S[9] and S[8] to generate D[7]. The second gate G2 performs an XOR operation on S[9] and S[7] to generate D[6]. The third gate G3 performs an XOR operation on S[9] and S[6] to generate D[5]. The fourth gate G4 performs an XOR operation on S[9] and S[5] to generate D[4]. As such, when S[9] is "1", S[8:5] are inverted; when S[9] is "0", S[8:5] are not inverted.

The fifth gate G5 performs an XOR operation on S[0] and S[4] to generate D[3]. The sixth gate G6 performs an XOR operation on S[0] and S[3] to generate D[2]. The seventh gate G7 performs an XOR operation on S[0] and S[2] to generate D[1]. The eighth gate G8 performs an XOR operation on S[0] and S[1] to generate D[0]. As such, when S[0] is "1", S[4:1] are inverted; when S[0] is "0", S[4:1] are not inverted.

Figure 16:
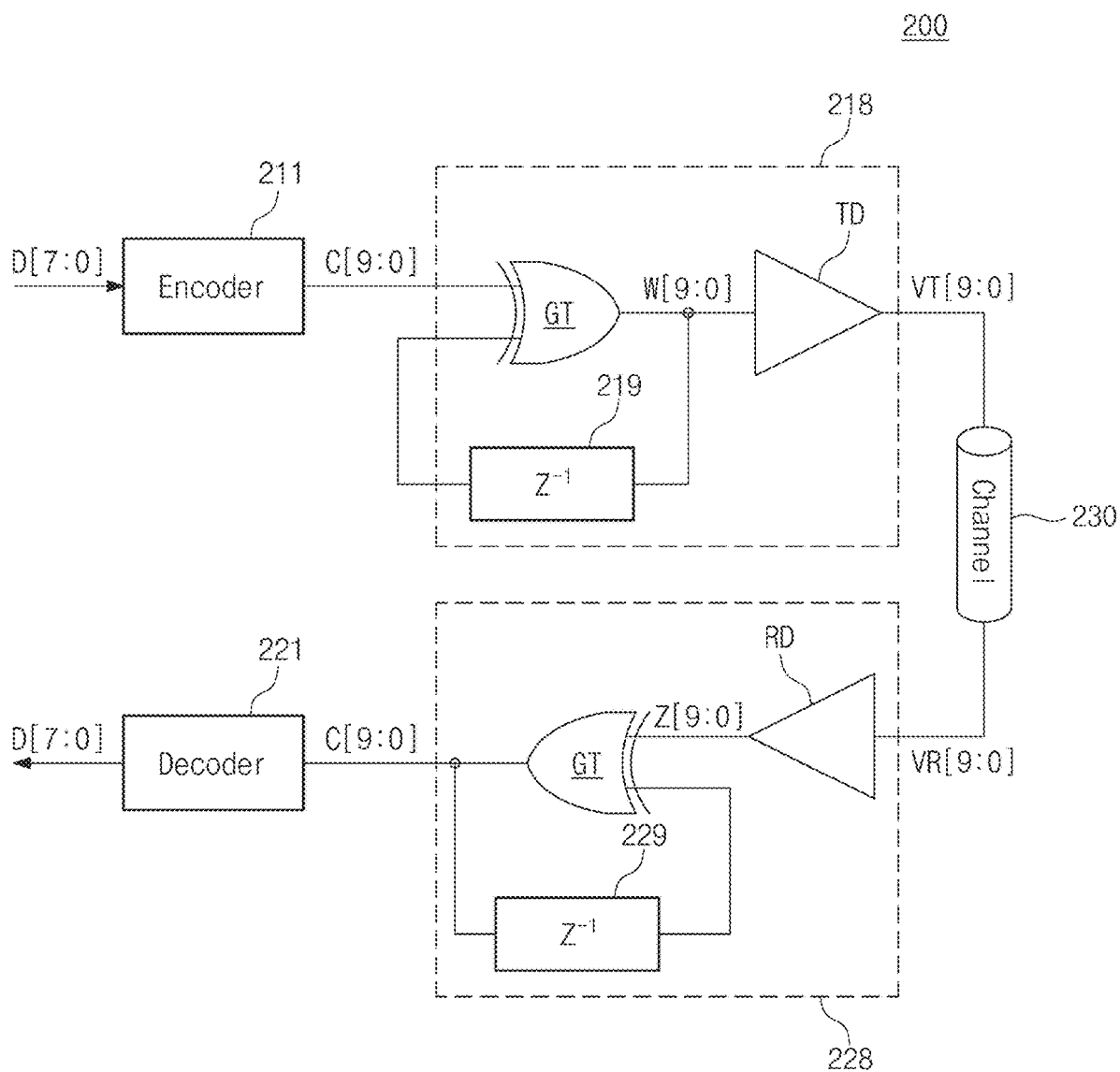
FIG. 16 is a block diagram illustrating a system corresponding to one channel, in a semiconductor system of FIG. 1.

FIG. 16 is a block diagram illustrating a system corresponding to one channel, in a semiconductor system of FIG. 1. Referring to FIG. 16, a semiconductor system 200 includes an encoder 211, a transmission interface circuit 218, a decoder 221, a reception interface circuit 228, and a channel 230. The encoder 211 corresponds to the encoder 111 of FIGS. 1 and 2, and the decoder 221 corresponds to the decoder 121 of FIGS. 1 and 11.

As described above, the encoder 211 may convert the data bits D[7:0] to the code bits C[9:0]. The code bits C[9:0] are converted into transmission signals VT[9:0] to be transmitted to the channel 230 by the transmission interface circuit 218. The channel 230 may receive one of the transmission signals VT[9:0], and the remaining transmission signals are received by other channels arranged in parallel. Likewise, the transmission interface circuit 218 converts one of the code bits C[9:0] into a transmission signal, and the remaining code bits are converted by other transmission interface circuits arranged in parallel.

The transmission interface circuit 218 may include an XOR gate GT, a delay 219, and a transmission driver TD. A transition that occurs when logical values of the code bits C[9:0] are "1" may be detected by the XOR gate GT and the delay 219. The XOR gate GT may output transmission bits W[9:0] corresponding to the code bits C[9:0] to the transmission driver TD, based on detecting the transition. The transmission driver TD may convert the transmission bits W[9:0] into the transmission signals VT[9:0] capable of being transmitted through the channel 230.

The reception interface circuit 228 converts reception signals VR[9:0] received through the channel 230 into the code bits C[9:0]. The reception interface circuit 228 may include an XOR gate GT, a delay 229, and a reception driver RD. The reception driver RD may convert the reception signals VR[9:0] into reception bits Z[9:0] being a digital signal. A transition that occurs when logical values of the reception bits Z[9:0] are "1" may be detected by the XOR gate GT and the delay 219. The XOR gate GT may output the code bits C[9:0] to the decoder 221, based on detecting the transition. As described above, the decoder 221 converts the code bits C[9:0] into the data bits D[7:0].

Figure 17:
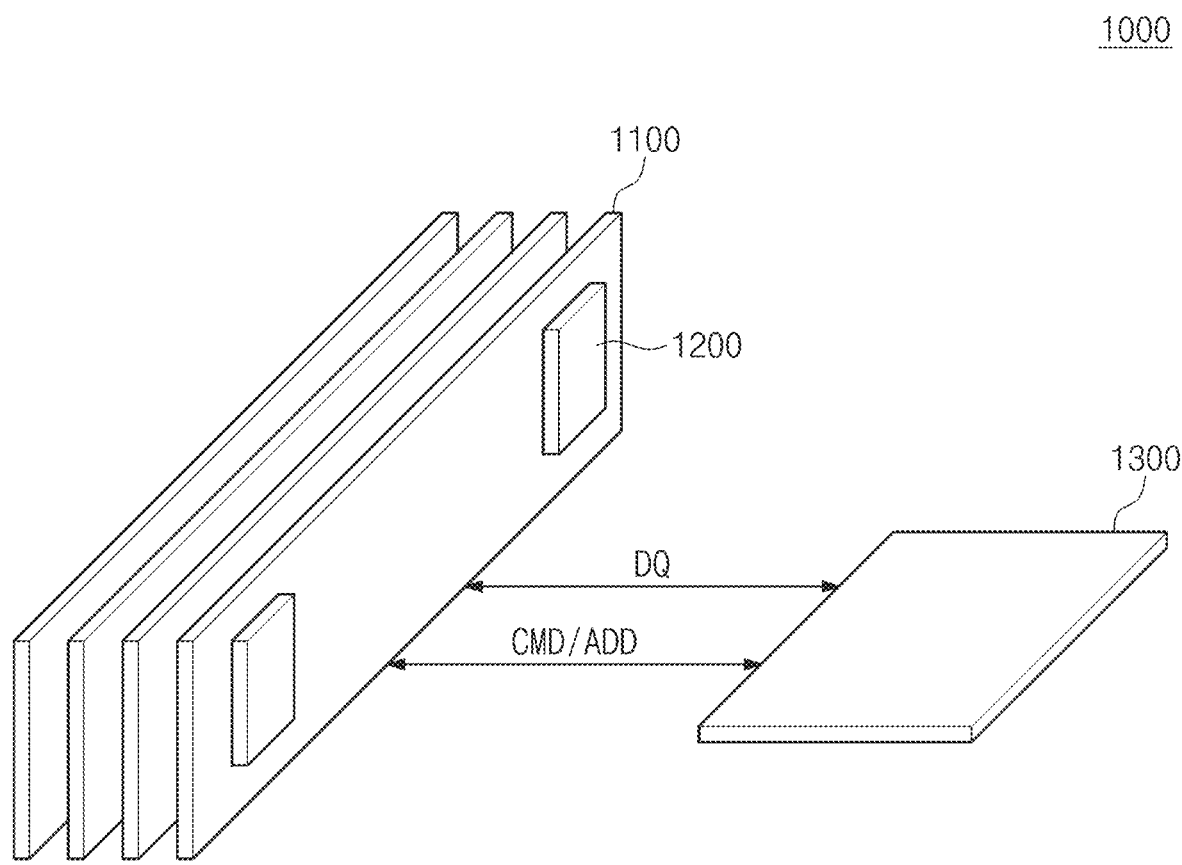
FIGS. 17 to 20 are exemplary diagrams of electronic devices to which an encoder and a decoder described with reference to FIGS. 1 to 16 are applied.

FIG. 17 is an exemplary diagram of an electronic device to which an encoder and a decoder described with reference to FIGS. 1 to 16 are applied. An electronic device 1000 may be referred to as a "computing system", a "memory system", an "electronic system", or a "communication system". The electronic device 1000 may include a memory module 1100 and a memory controller 1300. Although not illustrated in FIG. 17, the electronic device 1000 may further include a substrate on which the memory module 1100 and the memory controller 1300 are disposed and a socket in which the memory module 1100 is mounted.

The memory module 1100 may include a memory device 1200. In the electronic device 1000, the number of memory modules 1100 and the number of memory devices 1200 attached to one memory module 1100 are not limited to the example of FIG. 17. The memory module 1100 may be a dual in-line memory module (DIMM) that complies with the JEDEC (Joint Electron Device Engineering Council) standard. The memory module 1100 may be a registered DIMM (RDIMM), a load reduced DIMM (LRDIMM), an unbuffered DIMM (UDIMM), a fully buffered DIMM (FB-DIMM), a small outline DIMM (SO-DIMM), or any other memory module (e.g., a single in-line memory module (SIMM)).

The memory device 1200 may be various DRAM devices such as a double data rate synchronous dynamic random access memory (DDR SDRAM), DDR2 SDRAM, DDR3 SDRAM, DDR4 SDRAM, DDR5 SDRAM, a low power double data rate (LPDDR) SDRAM, LPDDR2 SDRAM, LPDDR3 SDRAM, LPDDR4 SDRAM, LPDDR4X SDRAM, LPDDR5 SDRAM, a graphics double data rate synchronous graphics random access memory (GDDR SGRAM), GDDR2 SGRAM, GDDR3 SGRAM, GDDR4 SGRAM, GDDR5 SGRAM, GDDR6 SGRAM, etc. The memory device 1200 may be a memory device, in which DRAM dies are stacked, such as a high bandwidth memory (HBM), HBM2, HBM3, etc. The memory device 1200 may include a static random access memory (SRAM) device, a thyristor RAM (TRAM) device, a NAND flash memory device, a NOR flash memory device, a resistive RAM (RRAM), a ferroelectric RAM (FRAM), a phase change RAM (PRAM), a magnetic RAM (MRAM), etc. Kinds of the memory device 1200 are not limited to the above kinds, and the memory device 1200 may include any device capable of storing data.

A plurality of paths through which command/address signals CMD/ADD and data input/output signals DQ are transmitted may be interposed between the memory module 1100 and the memory controller 1300. The plurality of paths may correspond to the channels 130 of FIG. 1.

The memory device 1200 may include at least one of the transmitter 110 or the receiver 120 described above. For example, the memory device 1200 may receive the command/address signals CMD/ADD transmitted through the plurality of paths from the memory controller 1300 by using the receiver 120. For example, the memory device 1200 may transmit or receive the data input/output signals DQ through the plurality of paths by using at least one of the transmitter 110 or the receiver 120.

The memory controller 1300 may also include at least one of the transmitter 110 or the receiver 120 described above. For example, the memory controller 1300 may transmit the command/address signals CMD/ADD to the plurality of paths by using the transmitter 110. For example, the memory controller 1300 may transmit or receive the data input/output signals DQ through the plurality of paths by using at least one of the transmitter 110 or the receiver 120.

Figure 18:
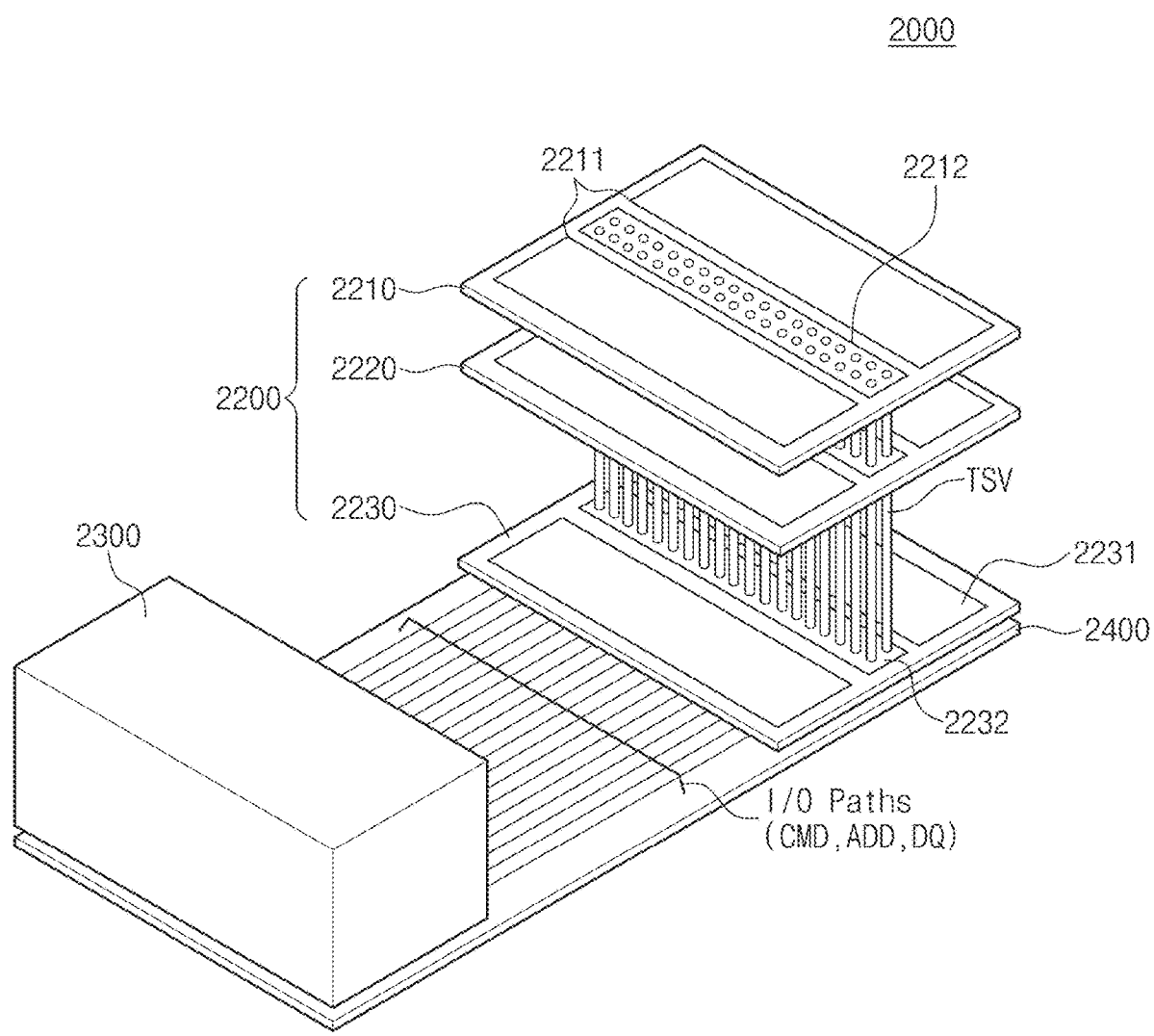

FIG. 18 is an exemplary diagram of an electronic device to which an encoder and a decoder described with reference to FIGS. 1 to 16 are applied. An electronic device 2000 may include a memory device 2200, a system-on-chip (SoC) 2300, and a substrate 2400.

The memory device 2200 may include memory dies 2210 and 2220 and a buffer die 2230, which are stacked in a vertical direction. The memory device 2200 may be a high bandwidth memory (HBM) device providing a high bandwidth. The memory device 2200 may be disposed on one surface of the substrate 2400, and solder balls or bumps may be disposed on one surface of the memory device 2200. The memory device 2200 and the substrate 2400 may be electrically interconnected through the solder balls or the bumps.

Through-silicon vias TSV may provide physical or electrical paths between the memory dies 2210 and 2220 and the buffer die 2230. For example, the through-silicon vias TSV may be arranged in the form of a matrix, and locations where the through-silicon vias TSV are arranged are not limited to the example of FIG. 18.

The memory die 2210 may include a first area 2211 and a second area 2212. The components of the memory device 1200 described with reference to FIG. 17 may be placed in the first area 2211. The through-silicon vias TSV may be disposed in the second area 2212, and circuits for transmitting or receiving signals through the through-silicon vias TSV may be disposed in the second area 2212. For example, at least one of the transmitter 110 or the receiver 120 described above may be disposed in the second area 2212. The memory die 2220 may be implemented to be substantially identical to the memory die 2210.

The buffer die 2230 (referred to as a "core die" or a "logic die") may include a first area 2231 and a second area 2232. To transfer a command CMD, an address ADD, and a data input/output signal DQ transmitted through input/output paths, at least one of the transmitter 110 or the receiver 120 described above may be disposed in the first area 2231. Also, the components of the memory device 1200 described with reference to FIG. 17 may be disposed in the first area 2231. The through-silicon vias TSV may be disposed in the second area 2232, and circuits for transmitting or receiving signals through the through-silicon vias TSV may be disposed in the second area 2232.

The SoC 2300 may be disposed on one surface of the substrate 2400, and solder balls or bumps may be disposed on one surface of the SoC 2300. The SoC 2300 and the substrate 2400 may be electrically interconnected through the solder balls or the bumps. The SoC 2300 may include the components of the memory controller 1300 of FIG. 17, a processor, an on-chip memory, etc. The SoC 2300 may include at least one of the transmitter 110 or the receiver 120 described above for the purpose of transmitting or receiving the data input/output signal DQ through the input/output paths.

The substrate 2400 may provide an input/output path between the SoC 2300 and the memory device 2200. For example, the substrate 2400 may include a printed circuit board, a flexible circuit board, a ceramic substrate, or an interposer. In the case where the substrate 2400 is the interposer, the substrate 2400 may be implemented by using a silicon wafer. A plurality of input/output paths may be implemented within the substrate 2400.

Figure 19:
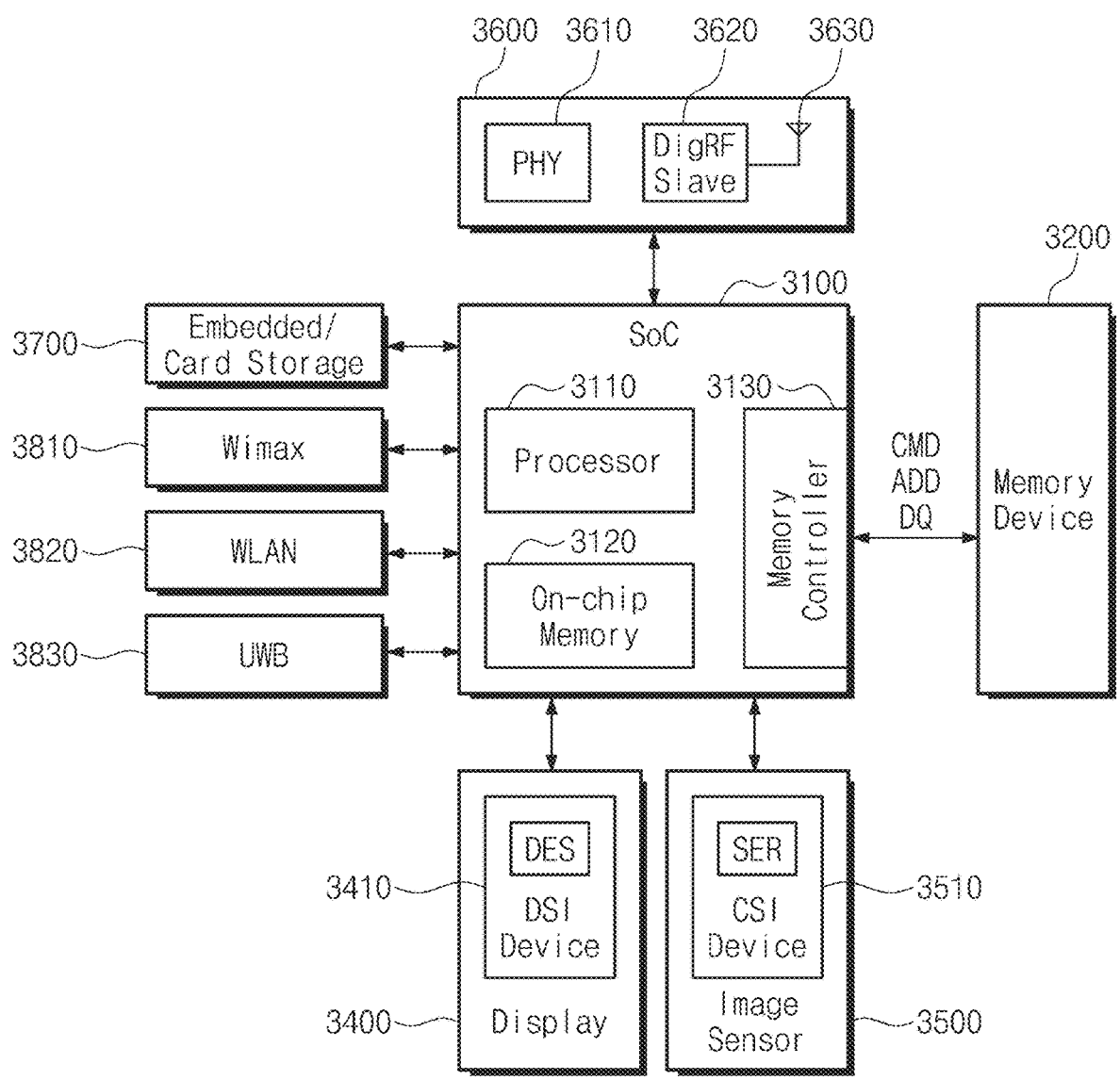

FIG. 19 is an exemplary diagram of an electronic device to which an encoder and a decoder described with reference to FIGS. 1 to 16 are applied. An electronic device 3000 may be implemented with an electronic device that may use or support interfaces proposed by the mobile industry processor interface (MIPI) alliance. For example, the electronic device 3000 may be, but is not limited to, one of a server, a computer, a smartphone, a tablet, personal digital assistant (PDA), a digital camera, a portable multimedia player (PMP), a wearable device, an Internet of Things (IoT) device, a mobile device, etc.

The electronic device 3000 may include a SoC 3100 and a memory device 3200. The SoC 3100 may include a processor 3110, an on-chip memory 3120, and a memory controller 3130. The SoC 3100 may be referred to as an "application processor". The processor 3110 may execute various programs stored in the on-chip memory 3120 and may control the memory controller 3130. The memory controller 3130 may include the components of the memory controller 1300 of FIG. 17. The memory device 3200 may include the components of the memory device 1200 of FIG. 17. The memory controller 3130 may transmit the command CMD, the address ADD, and the data input/output signal DQ to the memory device 3200. The memory device 3200 may transmit the data input/output signal DQ to the memory controller 3130.

The electronic device 3000 may further include a display 3400 communicating with the SoC 3100. The SoC 3100 may communicate with a display serial interface (DSI) device 3410 in compliance with a DSI. An optical deserializer DES may be implemented in the DSI device 3410. The electronic device 3000 may further include an image sensor 3500 communicating with the SoC 3100. The SoC 3100 may communicate with a camera serial interface (CSI) device 3510 in compliance with a CSI. An optical serializer SER may be implemented in the CSI device 3510.

The electronic device 3000 may further include a radio frequency (RF) chip 3600 that communicates with the SoC 3100. The RF chip 3600 may include a physical layer 3610, a DigRF slave 3620, and an antenna 3630. For example, the physical layer 3610 and the SoC 3100 may exchange data with each other in compliance with a DigRF interface proposed by the MIPI alliance.

The electronic device 3000 may further include embedded/card storage 3700. The embedded/card storage 3700 may store data provided from the SoC 3100. The electronic device 3000 may communicate with an external system through worldwide interoperability for microwave access (WiMAX) 3810, a wireless local area network (WLAN) 3820, an ultra-wide band (UWB) 3830, etc.

In some example embodiments, each of the components 3100, 3110, 3120, 3130, 3200, 3400, 3410, 3500, 3510, 3600, 3610, 3620, 3630, 3700, 3810, 3820, and 3830 of the electronic device 3000 may include at least one of the transmitter 110 or the receiver 120 described above for the purpose of exchanging data with any other component of the electronic device 3000.

Figure 20:
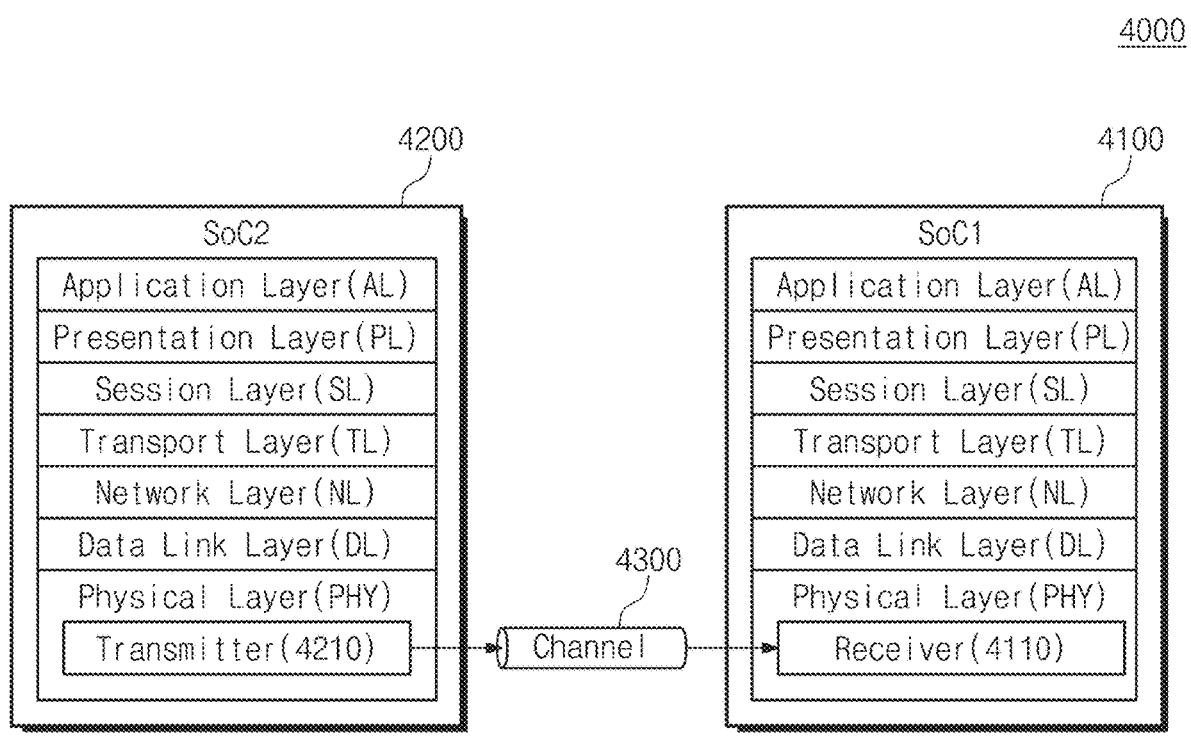

FIG. 20 is an exemplary diagram of an electronic device to which an encoder and a decoder described with reference to FIGS. 1 to 16 are applied. An electronic device 4000 may include a first SoC 4100 and a second SoC 4200.

The first SoC 4100 and the second SoC 4200 may communicate with each other based on the open system interconnection (OSI) 7-layer structure proposed in the international standard organization. For example, each of the first SoC 4100 and the second SoC 4200 may include an application layer AL, a presentation layer PL, a session layer SL, a transport layer TL, a network layer NL, a data link layer DL, and a physical layer PHY.

The layers of the first SoC 4100 may physically or logically communicate with the corresponding layers of the second SoC 4200. The application layer AL, the presentation layer PL, the session layer SL, the transport layer TL, the network layer NL, the data link layer DL, and the physical layer PHY of the first SoC 4100 may logically or physically communicate with the application layer AL, the presentation layer PL, the session layer SL, the transport layer TL, the network layer NL, the data link layer DL, and the physical layer PHY of the second SoC 4200, respectively.

In some example embodiments, the physical layer PHY of the first SoC 4100 may include a receiver 4110. The receiver 4110 may be the receiver 120 described above. The physical layer PHY of the second SoC 4200 may include a transmitter 4210 that transmits a transmission signal over a channel 4300. The transmitter 4210 may be the transmitter 110 described above.

According to a transmitter to transmit signals to channels, a receiver to receive signals from the channels, and a semiconductor system including the transmitter and the receiver, signals may be encoded or decoded such that transitions of parallel signals decrease. Accordingly, a crosstalk between channels may decrease.

While some example embodiments has been described with reference to example embodiments thereof, it will be apparent to those of ordinary skill in the art that various changes and modifications may be made thereto without departing from the spirit and scope of some example embodiments as set forth in the following claims.

What is claimed is:

1. A transmitter which outputs transmission signals in parallel to channels, comprising:
    an encoder configured to
        receive data bits,
        generate conversion bits based on a number of the data bits and a number of bits having a target logical value, a number of the conversion bits being more than the number of the data bits,
        detect a risk pattern of the conversion bits to generate detection data, and
        convert the risk pattern into a replacement pattern based on the detection data to generate code bits, a number of the code bits being equal to the number of the conversion bits; and
    a transmission interface circuit configured to convert the code bits into the transmission signals.

2. The transmitter of claim 1, wherein the encoder is configured to:
    generate first partial conversion bits of the conversion bits based on a number of first bits having the target logical value from among first partial data bits of the data bits; and
    generate second partial conversion bits of the conversion bits based on a number of second bits having the target logical value from among second partial data bits of the data bits.

3. The transmitter of claim 2, wherein the encoder is configured to:
    invert logical values of the first partial data bits to generate the first partial conversion bits based on the number of the first bits being more than half a total number of the first partial data bits; and
    invert logical values of the second partial data bits to generate the second partial conversion bits, based on the number of the second bits being more than half a total number of the second partial data bits.

4. The transmitter of claim 3, wherein
    the number of the data bits is 8,
    the number of the conversion bits is 10,
    the number of the channels is 10,
    the number of the first partial data bits is 4,
    the number of the second partial data bits is 4,
    the number of the first partial conversion bits is 5, and
    the number of the second partial conversion bits is 5;
    wherein 4 bits of the first partial conversion bits correspond to the first partial data bits, respectively, and a remaining bit of the first partial conversion bits other than the 4 bits indicates whether the first partial data bits are inverted; and wherein 4 bits of the second partial conversion bits correspond to the second partial data bits, respectively, a remaining bit of the second partial conversion bits other than the 4 bits indicates whether the second partial data bits are inverted.

5. The transmitter of claim 1, wherein the conversion bits, respectively corresponding to 4 channels sequentially arranged, have 3 or more conversion bits having the target logical value in the risk pattern.

6. The transmitter of claim 5, wherein the encoder is configured to detect a first pattern of the conversion bits based on the data bits;

generate a first detection bit of the detection data having a logical value that depends on whether the first pattern is detected;

detect a second pattern of the conversion bits based on the data bits; and generate a second detection bit of the detection data having a logical value that is based on whether the second pattern is detected, wherein the first pattern has the risk pattern and 2 of first partial conversion bits of the conversion bits have the target logical value in the first pattern, and wherein the second pattern has the risk pattern and 2 of second partial conversion bits of the conversion bits have the target logical value in the second pattern.

7. The transmitter of claim 1, wherein the encoder generates replacement bits respectively corresponding to the data bits based on bits respectively corresponding to the data bits from among the conversion bits, wherein, based on the conversion bits having the risk pattern, the replacement bits are generated to have the replacement pattern, and wherein the replacement bits, respectively corresponding to 4 channels sequentially arranged, have less than 3 replacement bits having the target logical value in the replacement pattern.

8. The transmitter of claim 7, wherein the encoder is configured to:

based on the risk pattern being present in the conversion bits, generate the detection data having a first logical value; and based on the risk pattern being absent from the conversion bits, generate the detection data having a second logical value, wherein, based on the detection data having the first logical value, some of the code bits are the replacement bits, and wherein, based on the detection data having the second logical value, the code bits are the conversion bits.

9. A semiconductor system comprising:
a transmitter including
an encoder configured to
receive data bits,
generate conversion bits based on a number of the data bits and a number of bits having a target logical value, a number of the conversion bits being more than the number of the data bits,
detect a risk pattern of the conversion bits to generate detection data, and
convert the risk pattern into a replacement pattern based on the detection data to generate code bits, a number of the code bits being equal to the number of the conversion bits; and
a transmission interface circuit configured to convert the code bits into the transmission signals; and
a channel unit including channels, a number of the channels being equal to a number of the code bits, and configured to receive signals generated based on the code bits; and
a receiver configured to receive the signals through the channel unit, convert the signals into the code bits, and convert the code bits into the data bits.

10. The semiconductor system of claim 9, wherein
the encoder is configured to generate the code bits based on the data bits such that the code bits, respectively corresponding to 4 channels sequentially arranged, have less than 3 code bits having the target logical value.

11. The semiconductor system of claim 9, wherein the transmitter is configured to:
generate first partial conversion bits of the conversion bits based on a number of first bits having the target logical value from among first partial data bits corresponding to half the data bits; and
generate second partial conversion bits of the conversion bits based on a number of second bits having the target logical value from among second partial data bits corresponding to a remaining half of the data bits.

12. The semiconductor system of claim 9, wherein the receiver includes:
a reception interface circuit configured to convert the signals received from the channel unit into the code bits; and
a decoder configured to generate detection data based on a pattern of the code bits, convert the code bits into the conversion bits based on the detection data, and convert the conversion bits into the data bits.

13. The semiconductor system of claim 9, wherein the receiver is configured to:
determine whether the code bits are converted into the replacement pattern, based on a pattern of the code bits; and
based on the code bits being converted into the replacement pattern, generate the conversion bits by converting the replacement pattern into the risk pattern.

14. The semiconductor system of claim 9, wherein
a number of the channels is 10,
a number of the conversion bits is 10, and
a number of the data bits is 8.

* * * * *